(12) United States Patent
Yeh

(10) Patent No.: US 11,368,024 B2
(45) Date of Patent: Jun. 21, 2022

(54) CONTROLLERS FOR PHOTOVOLTAIC-ENABLED DISTRIBUTION GRID

(71) Applicant: The Government of the United States of America, as represented by the Secretary of the Navy, Arlington, VA (US)

(72) Inventor: Hen-Geul Yeh, Cypress, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/996,968

(22) Filed: Aug. 19, 2020

(65) Prior Publication Data
US 2021/0057916 A1 Feb. 25, 2021

Related U.S. Application Data

(60) Provisional application No. 62/889,075, filed on Aug. 20, 2019.

(51) Int. Cl.
*H02J 3/38* (2006.01)
*G05B 19/042* (2006.01)

(52) U.S. Cl.
CPC ............ *H02J 3/381* (2013.01); *G05B 19/042* (2013.01); *H02J 2203/20* (2020.01); *H02J 2300/24* (2020.01)

(58) Field of Classification Search
CPC .... H02J 3/381; H02J 2203/20; H02J 2300/24; H02J 3/50; G05B 19/042; G05B 13/048; Y02E 10/56
See application file for complete search history.

(56) References Cited

U.S. PATENT DOCUMENTS

| 2014/0058571 A1* | 2/2014 | Hooshmand | G05B 15/02 700/286 |
| 2015/0340863 A1* | 11/2015 | Low | H02J 3/00 700/286 |
| 2016/0359328 A1* | 12/2016 | Hunt | H02J 7/34 |

(Continued)

OTHER PUBLICATIONS

L. S. P. Lawrence, Z. E. Nelson, E. Mallada and J. W. Simpson-Porco, "Optimal Steady-State Control for Linear Time-Invariant Systems," 2018 IEEE Conference on Decision and Control (CDC), 2018, pp. 3251-3257, doi: 10.1109/CDC.2018.8619812. (Year: 2018).*

(Continued)

Primary Examiner — Thomas C Lee
Assistant Examiner — Charles Cai
(74) Attorney, Agent, or Firm — Office of Naval Research; Hong-Vinh Nguyen

(57) ABSTRACT

Centralized controllers for a photovoltaic-enabled distribution grid are described herein. Photovoltaic cells may generate electricity that may be supplied to the distribution grid, which may experience unexpected abnormal power loads. The controllers utilize photovoltaic inverters connected to the photovoltaic cells to optimize the performance of the grid by absorbing or injecting reactive power. These controllers are particularly efficient in handling unexpected abnormal power loads.

10 Claims, 11 Drawing Sheets

(56) References Cited

U.S. PATENT DOCUMENTS

2017/0111223 A1* 4/2017 Matni .................. H04L 45/42

OTHER PUBLICATIONS

E. Dall'Anese, S. V. Dhople and G. B. Giannakis, "Photovoltaic Inverter Controllers Seeking AC Optimal Power Flow Solutions," in IEEE Transactions on Power Systems, vol. 31, No. 4, pp. 2809-2823, Jul. 2016, doi: 10.1109/TPWRS.2015.2454856. (Year: 2016).*

S. Bolognani, R. Carli, G. Cavraro and S. Zampieri, "A distributed control strategy for optimal reactive power flow with power and voltage constraints," 2013 IEEE International Conference on Smart Grid Communications (SmartGridComm), 2013, pp. 115-120, doi: 10.1109/SmartGridComm.2013.6687943 (Year: 2013).*

Miranda et al., "An improved fuzzy inferencesystem for voltage/var control," IEEE Trans. Power Syst., vol. 22, No. 4, Nov. 2007, 6 pages.

Ramakrishna et al., "Adaptive neuro-fuzzy inference system for volt/var control in distribution systems," Elect. Power Syst. Res., vol. 49, No. 2, 1999, 11 pages.

Yeh et al., "Adaptive VAR control for distribution circuits with photovoltaic generators," IEEE Trans. Power Syst., vol. 27, No. 3, Aug. 2012, 8 pages.

Turitsyn et al., "Local control of reactive power by distributed photovoltaic generators," Proc. 1st IEEE Int. Conf. Smart Grid Commun., 2010, 6 pages.

Liu et al., "Reactive power control methods for photovoltaic inverters to mitigate short-term voltage magnitude fluctuations," Elect. Power Syst. Res., vol. 127, 2015, 8 pages.

Qin et al., "A survey of industrial model predictive control technology," Control Eng. Pract., vol. 11, No. 7, 2003, 32 pages.

Moradzadeh et al., "Voltage coordination in multi-area power systems via distributed model predictive control," IEEE Trans. Power Syst., vol. 28, No. 1, Feb. 2013, 9 pages.

Balram et al., "Comparative study of MPC based coordinated voltage control in LV distribution systems with photovoltaics and battery storage," Elect. Power Energy Syst., vol. 95, 2018, 12 pages.

Wang et al., "MPC-based voltage/Var optimization for distribution circuits with distributed generators and exponential load models," IEEE Trans. Smart Grid, vol. 5, No. 5, Sep. 2014, 9 pages.

Valverde et al., "Model predictive control of voltages in active distribution networks," IEEE Trans. Smart Grid, vol. 4, No. 4, Dec. 2013, 10 pages.

Bighash et al., "High quality model predictive control for single phase grid-connected photovoltaic inverters," Elect. Power Syst. Res., vol. 158, 2018, 11 pages.

Turitsyn et al., "Distributed control of reactive power flowin a radial distribution circuit with high photovoltaic penetration," Proc. IEEE PES General Meeting, 2010, 6 pages.

Renmu et al., "Composite load modeling via measurement approach," IEEE Trans. Power Syst., vol. 21, No. 2, May 2006, 10 pages.

Kontis et al., "Measurement-based dynamic load modeling using the vector filling technique," IEEE Trans. Power Syst., vol. 33, No. 1, Jan. 2018, 14 pages.

Romero, "Dynamic load models for power systems-estimation of time varying parameters during normal operation," Ph. D. Dissertation, Dept. Ind. Elect.l Eng. Automat., Lund University, 2002, 167 pages.

Rouhani et al., "Real-time dynamic parameter estimation for an exponential dynamic load model," IEEE Trans. Smart Grid, vol. 7, No. 3, May 2016, 7 pages.

Zhu et al., "Automatic identification of power system load models based on field measurements," IEEE Trans. Smart Grid, vol. 33, No. 3, May 2018, 10 pages.

IEEE Standard for Interconnection and Interoperability of Distributed Energy Resources With Associated Electric Power Systems Interfaces, IEEE Std 1547-2018, 2018, 138 pages.

Calderaro et al., "A smart strategy for voltage control ancillary service in distribution networks," IEEE Trans. Power Syst., vol. 30, No. 1, Jan. 2015, 9 pages.

Rawlings et al., "The stability of constrained receding horizon control," IEEE Trans. Autom. Control, vol. 38, No. 10, Oct. 1993, 5 pages.

Limon et al., "On the stability of constrained MPC without terminal constraint," IEEE Trans. Autom. Control, vol. 51, No. 5, May 2006, 5 pages.

Lopez-Negrete et al., "Fast nonlinear model predictive control: Formulation and industrial process applications," Comp. Chem. Eng., vol. 51, No. 5, 2013, 10 pages.

Richter et al., "Computational complexity certification for real-time MPC with input constraints based on the fast gradient method," IEEE Trans. Autom. Control, vol. 57, No. 6, Jun. 2012, 13 pages.

Schneider et al., "Modern grid initiative distribution taxonomy final report," Pac. Northwest Nat. Lab., Richland,WA, USA, Tech. Rep. PNNL-18035, 2008, 40 pages.

Yang et al., "Optimal Control Methods for Photovoltaic Enabled Grid With Abnormal Power Loads," IEEE Systems Journal, vol. 14, No. 1, Mar. 2020, 10 pages.

* cited by examiner

CONTROLLERS FOR PHOTOVOLTAIC-ENABLED DISTRIBUTION GRID

CROSS-REFERENCE TO RELATED APPLICATION

This application claims the benefits of U.S. Provisional Application No. 62/889,075 filed on Aug. 20, 2019, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #111278-US2.

BACKGROUND

Modern electric power systems are complex and may include renewable energy sources. Among the renewable energies, solar power generated by photovoltaic (PV) cells has become one of the most reliable and important electricity sources. A PV cell or a solar cell is a device that converts sunlight into electricity and serves as a building block of a PV system. Individual cells may vary in size and are typically electrically connected in a packaged module, panel or array.

PV cells, implemented as distributed generators, may supply electricity in locations where electricity distribution systems do not exist and they can also supply electricity to an electric power system. However, since distributed generators connect with the grid and inject powers, they also render serious voltage oscillation along the distribution line. Moreover, during power delivery from the power system, thermal loss in the distribution line also degrades the utility of PV cells. Hence, reducing the voltage fluctuation and power loss when large-scale PV cells are present within a smart grid becomes an important issue. Capacitor banks and under load tap changers are viable solutions, but their responses to the voltage change are slow.

SUMMARY

Methods, systems, apparatuses, and computer program products are described herein for control of a photovoltaic-enabled distribution grid. Centralized controllers utilize PV inverters to optimize the performance of the grid by absorbing or injecting reactive power. These controllers are particularly efficient in handling unexpected abnormal power loads.

A method for controlling a photovoltaic-enabled distribution grid is described herein. The method includes obtaining a plurality of input signals from a plurality of nodes within the distribution grid. Upon determining that a power load value from the plurality of nodes changed from a nominal value, determine a steady state value. Update a current power consumption value based on the plurality of input signals. Determine a control input based at least on the plurality of input signals. Provide the control input to a subset of the plurality of nodes that are photovoltaic enabled.

A system for controlling a photovoltaic-enabled distribution grid is described herein. The system includes a signal sensor configured to obtain a plurality of input signals from a plurality of nodes within the distribution grid. A steady state determiner configured to determine a steady state value upon determining that a power load value from the plurality of nodes changed from a nominal value is also included. An updater is configured to update a current power consumption value based on the plurality of input signals. A control input determiner configured to determine a control input based at least on the plurality of input signals; and a control input provider configured to provide the control input to a subset of the plurality of nodes that are photovoltaic-enabled are also included.

Another system is described herein. The system includes a processor and a memory that stores computer program logic for execution by the processor, the computer program logic includes: a signal sensor configured to obtain a plurality of input signals from a plurality of nodes within the distribution grid; a steady state determiner configured to determine a steady state value upon determining that a power load value from the plurality of nodes changed from a nominal value; a control input determiner configured to determine a control input based at least on the plurality of input signals; and a control input provider configured to provide the control input to a subset of the plurality of nodes that are photovoltaic enabled.

Figure 1:
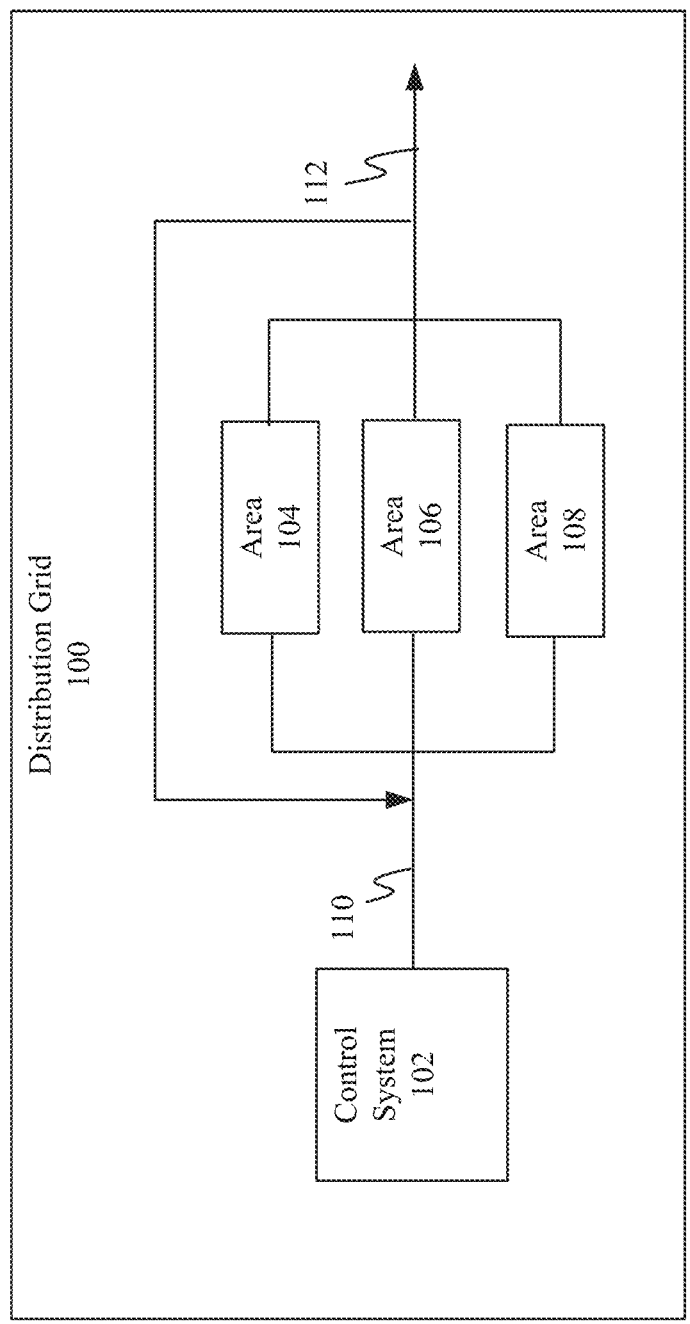
FIG. 1 is a block diagram of a photovoltaic-enabled distribution grid with a control system.

The features and advantages of the embodiments described herein will become more apparent from the detailed description when taken in conjunction with the drawings. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Definitions

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Recent progress on PV inverters shows great potentials in volt-ampere reactive control because it is able to push and pull reactive power in a much faster way, usually within seconds, compared to other methods. In addition, volt-ampere reactive control is economical and easy to implement as it may be completely implemented electronically. Accordingly, the controllers described herein are focused on volt-ampere reactive control by using PV inverters.

Model predictive control (MPC) is a method of process control that had been applied in many industries. Many processes may be considered to be approximately linear over a small operating range. Thus, linear MPC approaches may be used in many applications with the feedback mechanism of the MPC compensating for prediction errors due to mismatch between the model and the process. In general, MPC is based on an iterative, finite horizon optimization of a plant model. At time t, the current plant state is sampled and a control strategy may be computed for a relatively short time horizon in the future, t+T. An online or on-the-fly calculation may be used to explore state trajectories that originates from the current state and find a control strategy until time t+T. The first step of the control strategy may be implemented. The plant state may be sampled again, and the calculations may be repeated starting from the now-current state to generate a new control and new predicted state path. The prediction horizon is continuously shifted forward. Thus, MPC is a multivariable control technique that uses an internal dynamic model of the process, a history of past control moves, and an optimization constant over the prediction horizon.

Compared with traditional control methods, the main advantages of MPC include the ability to handle state/input/output constraints and to determine a sequence of control actions that explicitly optimize the future behavior of a system. Even though MPC was primarily developed for slow dynamic systems, progresses in computational hardware and software enable its application in fast dynamic plants, such as power systems.

Three MPC strategies, centralized, decentralized, and distributed may be used for voltage control. MPC has been shown to mitigate external disturbances and correct the voltage even when inaccurate sensitivity matrices and noisy measurements are used. MPC may also reduce total harmonic distortions in the output current of inverters. However, these MPC strategies focus on the optimization of long-term dynamic behavior, but the optimal operating point is not derived explicitly, which render serious oscillations and the steady-state optimality may not be guaranteed.

The system model plays an essential role in MPC. However, certain popular models, such as the DistFlow equations or the static exponential load model in combination with the DistFlow equations, are not suitable for MPC or difficult to implement (e.g., requiring difficult to determine pre-specified multipliers or having unknown parameters). The controllers described herein utilize an exponential dynamic load model and assume that power loads may be measured accurately in real time.

Two controllers are described herein. The first is a model predictive controller based on the dynamic load model to mitigate high power load disturbances and minimize power loss. The second is an optimal steady-state feedback controller with much smaller computational burdens than the model predictive controller. These two controllers are centralized controllers that are capable of performing the compensation for abnormal (unexpected and extremely high) power loads by manipulating and coordinating PV inverters along the grid.

Example Embodiments

FIG. 1 is a block diagram of a photovoltaic-enabled distribution grid with a centralized control system. As shown in FIG. 1, distribution grid 100 includes a centralized control system 102 that is connected to a plurality of consumer areas, a commercial area 104, a residential area 106, and a commercial and residential mixed area 108. These areas are for illustrative purposes only, as there may be other configurations of the grid. Control system 102 is configured to provide a control input 110 to the plurality of areas based on measured data 112 from the plurality of areas. Each area may include a plurality of nodes (e.g., a residential or commercial building). The distribution grid is part of a power system in which the voltage has been significantly reduced for delivering power to the specific nodes. While not shown in FIG. 1, grid 100 may include other components, for example, substations, several of which may exist between the generating station and the consumer nodes. A substation may include transformers to change voltage levels between high transmission voltages and lower distribution voltages or vice versa.

Figure 2:
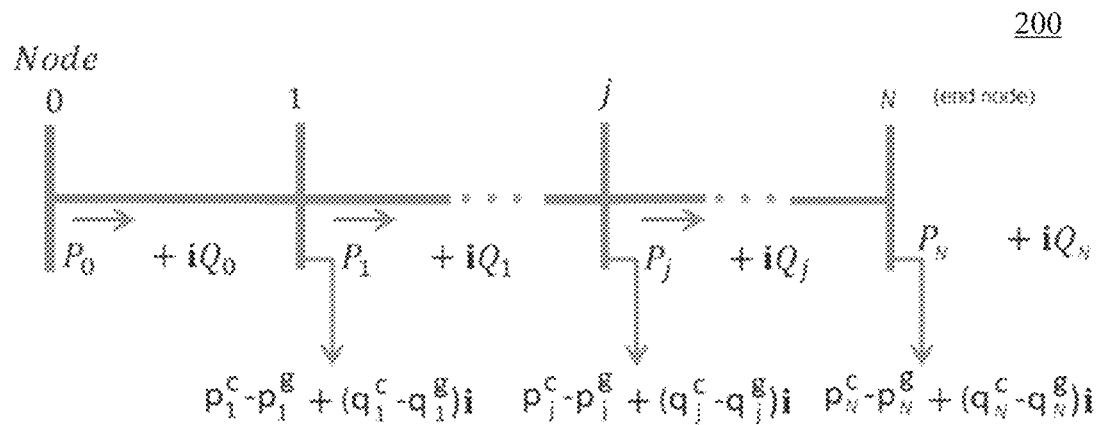
FIG. 2 is an example of a bidirectional single branch radial distribution circuit.

FIG. 2 is an example of a bidirectional single branch radial distribution grid 200. FIG. 2 depicts the general energy flow for grid 200. For example, node 0 may be a substation. Grid 200 is bidirectional because the nodes within grid 200 may receive from and supply power to grid 200. The controllers described herein are centralized controllers based on operating PV inverters to minimize power loss and voltage variation in the entire grid. The controllers may be implemented from the utility side. Grid 200 is shown as a one dimensional radial distribution grid as a non-limiting example, other grid configurations may be utilized in example embodiments. In FIG. 2, $P_j+iQ_j$ denotes the complex power flowing out of the distribution grid to node j. The power flows from a substation to a first node, a second node, and so on. Thus, the power consumption is considered a power load. $p_j^c+iq_j^c$ is the apparent power consumed at node j. $p_j^g$ is the real power generated by the PV cells, which may be converted by the photovoltaic inverters from direct current to alternating current. $q_j^g$ represents the reactive power generated by the PV cells, which is the manipulated variable used for control purpose. N+1 is the total number of nodes. The controllers will be described as follows with reference to the notations in FIG. 2.

DistFlow Equations

A linearized DistFlow model is adopted to represent the relationship between real/reactive powers and the voltage at each node. Real power is energy that may be used to do work, and reactive power flow is needed in an alternating-current transmission system to support the transfer of real power over the network. Thus, the DistFlow equations may be used to model the distribution grid. The DistFlow equations are as follow.

$$P_{j+1} = P_j - p_{j+1}^c + p_{j+1}^g, \forall j \in \{0, 1, 2, \ldots, N\} \quad (1a)$$

$$Q_{j+1} = Q_j - q_{j+1}^c + q_{j+1}^g, \forall j \in \{0, 1, 2, \ldots, N\} \quad (1b)$$

$$V_{j+1} = V_j - \frac{(r_j P_j + x_j Q_j)}{V_0}, \forall j \in \{0, 1, 2, \ldots, N\} \quad (1c)$$

where $V_j$ is the voltage magnitude at node j; $V_0=1$ is the normalized base voltage at the substation; $P_j+iQ_j$ is the complex power flowing from node j to j+1; $p_j^c+iq_j^c$ is the apparent power consumed at node j; $r_j+ix_j$ is the impedance between j and j+1; $p_j^g$ is the real power generated by the PV cells; $q_j^g$ represents the reactive power generated by the PV cells, which is the manipulated variable used for control purpose. N+1 is the total number of nodes.

In a photovoltaic-enabled grid, the nodes equipped with solar panels and inverters belong to a set $\Omega$. The real power generation $p_j^g$, $\forall j \in \Omega$ is dependent on the solar irradiance, the capability of PV cell and inverter. Since it is essential to meet the real power demand, the power system dynamics is much faster than that of the weather, the real power generation $p_j^g$ is fixed at its highest possible value along the prediction horizon. The manipulated variable $q_j^g$ is bounded by the apparent power capability along the prediction horizon.

$$(q_j^g(k+h|k))^2 + (p_j^g(k+h|k))^2 \le (s_j^{max})^2, \forall k, \forall j \in \Omega \quad (2)$$

where $s_j^{max}$ represents the maximum capacity of a PV inverter. k represents the time instant. (k+h|k) represents the h-step ahead prediction at present time k. Equation (2) is a simplified version of the capacity limit. For a more complicated case, other versions may be used.

The objective function at time instant k, representing the performance of the grid over the time horizon H, may be expressed with the following.

$$\mathcal{L}_{k \to k+H} = \sum_{k=1}^{H} \sum_{j=0}^{N} r_j \frac{P_j(k+h|k)^2 + Q_j(k+h|k)^2}{V_0^2} \quad (3)$$

The objective function $\mathcal{L}$ is the summation of power loss along the prediction horizon. The controller minimizes $\mathcal{L}$ by injecting or absorbing $q_j^g$.

In addition, the voltage fluctuation is another undesirable factor that impacts power quality of delivery. Therefore, the voltage of each node is bounded by the following inequality:

$$V_0(1-\epsilon) \le V_j(k+h|k) \le V_0(1+\epsilon), \forall k, \forall j \quad (4)$$

where $\epsilon$ is a parameter specified by the operator. $\epsilon$ may normally be set to be 5% from the normalized base voltage at the substation. The voltage is bounded to enable good quality of service from the utility provider because electrical appliances last longer with stable/constant voltages. Certain cases, for example, appliances in hospital settings, may require constant voltages due to the nature of their operations.

Dynamic Power Load Model

Power consumptions $p_j^c$ and $q_j^c$ in reality are dependent on the voltage and time. Thus, it is possible to describe the dynamic power loads at node j by using two first-order ordinary differential equations.

$$T_p \frac{dp_j^r}{dt} + p_j^r = p_j^0 \left(\frac{V_j}{V_j^0}\right)^{\alpha_j^s} - p_j^0 \left(\frac{V_j}{V_j^0}\right)^{\alpha_j^t} \quad (5a)$$

$$T_q \frac{dq_j^r}{dt} + q_j^r = q_j^0 \left(\frac{V_j}{V_j^0}\right)^{\beta_j^s} - q_j^0 \left(\frac{V_j}{V_j^0}\right)^{\beta_j^t} \quad (5b)$$

$$p_j^c = p_j^r + p_j^0 \left(\frac{V_j}{V_j^0}\right)^{\alpha_j^t} \quad (5c)$$

$$q_j^c = q_j^r + q_j^0 \left(\frac{V_j}{V_j^0}\right)^{\beta_j^t} \quad (5d)$$

where $p_j^r$ and $q_j^r$ are the real/reactive power recovery. $V_j^0$, $p_j^0$, and $q_j^0$ are the initial voltage, real/reactive power consumptions. $\alpha_j^t$ and $\alpha_j^s$ are the transient and steady real power load-voltage-dependent coefficients, respectively. $\beta_j^t$ and $\beta_j^s$ are the transient and steady reactive power load-voltage-dependent coefficients, respectively. $T_p$ and $T_q$ are time constants. All model parameters may be identified from measured data.

The two first order differential equations, (5a) and (5b), may be further discretized by the finite difference approach and integrated with the DistFlow equations (i.e., (1a)-(1c)). The prediction model for all nodes in the grid becomes:

$$P_{j+1}(k+h|k) = \\ P_j(k+h|k) - p_{j+1}^c(k+h-1|k) + p_{j+1}^g(k+h-1|k) \quad (6a)$$

$$Q_{j+1}(k+h|k) = \\ Q_j(k+h|k) - q_{j+1}^c(k+h-1|k) + q_{j+1}^g(k+h-1|k) \quad (6b)$$

$$V_{j+1}(k+h|k) = V_j(k+h|k) - \frac{(r_j P_j(k+h|k) + x_j Q_j(k+h|k))}{V_0} \quad (6c)$$

$$p_j^r(k+h|k) = \frac{\Delta t}{T_p}\left(p_j^0\left(\frac{V(k+h-1|k)}{V_j^0}\right)^{\alpha_j^s} - \right. \quad (6d)$$

$$\left. p_j^0\left(\frac{V(k+h-1|k)}{V_j^0}\right)^{\alpha_j^t} - p_j^r(k+h-1|k)\right) + p_j^r(k+h-1|k)$$

$$q_j^r(k+h|k) = \frac{\Delta t}{T_q}\left(q_j^0\left(\frac{V(k+h-1|k)}{V_j^0}\right)^{\beta_j^s} - \right. \quad (6e)$$

$$\left. q_j^0\left(\frac{V(k+h-1|k)}{V_j^0}\right)^{\beta_j^t} - q_j^r(k+h-1|k)\right) + q_j^r(k+h-1|k)$$

$$p_j^c(k+h|k) = p_j^r(k+h|k) + p_j^0\left(\frac{V(k+h|k)}{V_j^0}\right)^{\alpha_j^t} \quad (6f)$$

$$q_j^c(k+h|k) = q_j^r(k+h|k) + q_j^0\left(\frac{V(k+h|k)}{V_j^0}\right)^{\beta_j^t} \quad (6g)$$

where $\Delta t$ is the sampling time interval. When h=1, the $q_j^c(k+h-1|k)$ and $p_j^c(k+h-1|k)$ are measured power loads at time k. Here, (6a) and (6b) are modified as difference equations. The decision variables $q_j^g$, $p_j^g$, $q_j^c$, and $p_j^c$ may determine the power delivery $P_j$ and $Q_j$ at the next time instant.

Model Predictive Controller

If power equipment at a node is turned on, then the power load at that node increases abnormally, and the voltage along the entire distribution grid will suddenly drop. This consequently impacts the power loads of all the nodes on the grid. In such a case, the inverter may increase reactive power output to compensate such an abrupt change.

Given the model prediction and real-time measurement, the model predictive controller may direct inverters to generate enough reactive power $q_j^g$ to minimize the power loss and guarantee the voltage constraint. MPC is an optimization-based discrete approach to regulate a system subject to input/state/output constraints. It solves an optimization problem online and yields a sequence of control actions for the entire prediction horizon, H. However, only the first control action is implemented, and at the next time step the entire optimization problem will be resolved with the latest measurements. It also forces control action to reach the optimal steady-state input $q_j^{g*}$ after time length H'. This receding horizon control scheme not only optimizes the open-loop performances over the entire horizon but also incorporate the feedback from the data measurement to update the optimization problem at each time step. Thus, the MPC is less sensitive to model errors and disturbances. However, the online computation demand of the MPC may be heavy if the model is high dimensional, with a long prediction horizon, or too many constraints are incorporated in the formula. In addition, the computational time may also depend on the structure of the problem, such as sparsity and the solver.

The model predictive controller optimizes the dynamics of power and voltage on all nodes over the prediction horizon H. Its formula at time instant k may be expressed as follows.

$$\min_{\substack{q_j^g(k+h|k), P_j(k+h|k), Q_j(k+h|k),\\ V_j(k+h|k), p_j^r(k+h|k), q_j^r(k+h|k),\\ p_j^c(k+h|k), q_j^c(k+h|k), \forall h, \forall j}} \mathcal{L}_{k \to k+H}$$

s.t. (6a) – (6g), (2), (4)

$$P_N(k+h|k) = 0, Q_N(k+h|k) = 0$$

$$V_0(k+h|k) = 1 \quad (7a)$$

$$q_j^g(k+h|k) = q_j^{g*}, \forall h > H' \quad (7b)$$

$$P_j(k+H|k) = P_j^*, Q_N(k+H|k) = Q_j^* \quad (7c)$$

$$\forall j \in \{0, 1, 2, \ldots, N\}, \forall h \in \{0, 1, 2, \ldots, H\}$$

where s.t. means "subject to." The prediction and control horizons are H and H', respectively, and H' is always less than or equal to H (H'≤H). Equation (7a) is the boundary condition of the system that shows the substation voltage and power flow on the last node. Equation (7b) shows that after H' steps, the input $q_j^g$ may be fixed at a pre-determined optimal steady-state value, $q_j^{g*}$. A short control horizon H' is not favorable to the stability of the system and may not make (7) feasible. The linear part of the power load model is a first-order system. A control horizon of 4~5 time constants may be adequate. The terminal state constraint (7c) requires that after time steps H, the power flow should reach the optimal state, $P_j^*$ and $Q_j^*$. Model predictive control with terminal state constraints is a standard way to guarantee the nominal stability of a system. If (7) is feasible, then the nominal system is stable. The calculation of the values of $q_j^{g*}$, $P_j^*$ and $Q_j^*$ will be described in reference to equation (9) below.

Softened Voltage Constraint

A common question for model predictive control implementation is its feasibility. The model predictive controller described herein may be infeasible (no solution) due to the limitations of inverters and solar panels if an extremely high power load occurs during the prediction horizon. In such a case, the voltage constraint may be softened as follows.

$$\min_{\substack{q_j^g(k+h|k), P_j(k+h|k), Q_j(k+h|k),\\ V_j(k+h|k), p_j^r(k+h|k), q_j^r(k+h|k),\\ p_j^c(k+h|k), q_j^c(k+h|k), \gamma, \forall h, \forall j}} \mathcal{L}_{k \to k+H} + \gamma^2 W \quad (8)$$

s.t. (6a) – (6g), (7a) – (7b), (2)

$$V_0 \cdot (1 - \epsilon - \gamma) \leq V_j(k+h|k) \leq V_0 \cdot (1 + \epsilon + \gamma)$$

$$\gamma \geq 0, \forall j \in \{0, 1, 2, \ldots, N\}, \forall h \in \{0, 1, 2, \ldots, H\}$$

where scalar $\gamma$ is a positive decision variable; W is a large weighting coefficient. The objective function integrates the power loss and voltage fluctuation. Thus, minimizing this function makes the voltage at most nodes within the desired range, and only a few of them may exceed the bound $V_0$ (1±ε). Given this relaxes solution, additional operations such as load shedding may be executed to further reduce the voltage variation at certain nodes with abnormal loads.

Although the MPC described herein (7) is nonconvex, due to the exponential load model, it is still solvable by off-the-shelf solvers. The number of decision variables is proportional to the length of prediction/control horizons and number of nodes. Thus, to reduce computational demands, a short prediction/control horizon for a microgrid with limited nodes may be utilized. For a large-scale grid with many nodes, fast nonlinear model predictive control strategies with special algorithms may be employed. A nonlinear MPC provides a natural extension to include nonlinear models for trajectory tracking and dynamic optimization. Thus, nonlinear MPC can include models developed for off-line dynamic studies as well as nonlinear data-driven models, and may require the application of efficient large-scale optimization strategies to avoid computational delays and to ensure stability, robustness and superior performance. In an embodiment, a nonlinear MPC approach may be utilized that solves the detailed optimization problem in background and applies a sensitivity-based update on-line.

Optimal Steady-State Values

At time instant k, the model predictive controller may optimize the dynamics of power and voltage within the finite horizon [k+1, k+2, . . . , k+H] and design the control inputs from k+1 to k+H'. To keep the system stability through (7c), an optimal operating point is desired, and is denoted by $P_j^*$, $Q_j^*$, $V_j^*$ and $q_j^{g*}$.

At the steady state, all variables of (7) are at constant values. Thus, the time index k may be ignored and h=0. The optimization problem (7) is significantly simplified and may be solved to search for the optimal steady-state values with minimal power loss.

$$\min_{P_j, Q_j, V_j, p_j^c, q_j^c, q_j^g, \forall j} \sum_{j=0}^{N} r_j \frac{P_j^2 + Q_j^2}{V_0^2} \quad (9)$$

s.t. $(1a) - (1c), (2), (4)$ $$p_j^c = p_j^0 \left( \frac{V_j}{V_j^0} \right)^{\alpha_j^t}, q_j^c = q_j^0 \left( \frac{V_j}{V_j^0} \right)^{\beta_j^t}$$

$P_N = 0, Q_N = 0, V_0 = 1$ $\forall j \in \{0, 1, 2, \ldots, N\}.$

There is no prediction, and thus h=0. Solving (9) yields the optimal steady-state values, $P_j^*$, $Q_j^*$, and $q_j^{g*}$.

Optimal Steady-State Feedback Controller

The optimal steady-state feedback controller (OSSFC) is another type of controller that requires much less computational effort compared to the model predictive controller. The OSSFC solves a small-scale optimization problem to calculate the optimal steady state when unexpected high power loads occur in the grid. At each time instant, given the measurement of power loads, this controller minimizes the difference between implementable $q_j^g$ and $q_j^g$ to reduce power loss and meet the voltage constraint.

The OSSFC uses real-time measurement of power loads to determine the control input $q_j^g$. Its formula at time instant k is as follows.

$$\min_{P_j, Q_j, V_j, q_j^g, \forall j} \sum_{j=0}^{N} (q_j^g(k) - q_j^{g*})^2 \quad (10)$$

s.t. $(1a) - (1c), (2), (4)$ $P_N(k) = 0, Q_N(k) = 0, V_0 = 1$ $\forall j \in \{0, 1, 2, \ldots, N\}$ where $p_j^c(k)$ and $q_j^c(k)$ in (1a) and (1b) are measured power loads at time instant k. The optimal steady-state feedback controller (10) is different from model predictive controller (7) in that it does not make a prediction, and thus h=0. Its objective is to minimize the difference between the current input $q_j^g(k)$ and the optimal steady-state input $q_j^{g*}$. If the voltage derived from $q_j^{g*}$ meets constraint (4), then $q_j^{g*}$ is the optimal solution of (10); otherwise, (10) may be solved to find a value of $q_j^g$ that is close enough to $q_j^{g*}$ meets the voltage constraint. Feedback controller (10) is convex and may be solved in real time when new measurements on power loads are available. Compared with the model predictive controller, the OSSFC does not use multiple-step ahead prediction and terminal state constraints. The OSSFC arrives at a solution very fast, and is thus very efficient.

Figure 3:
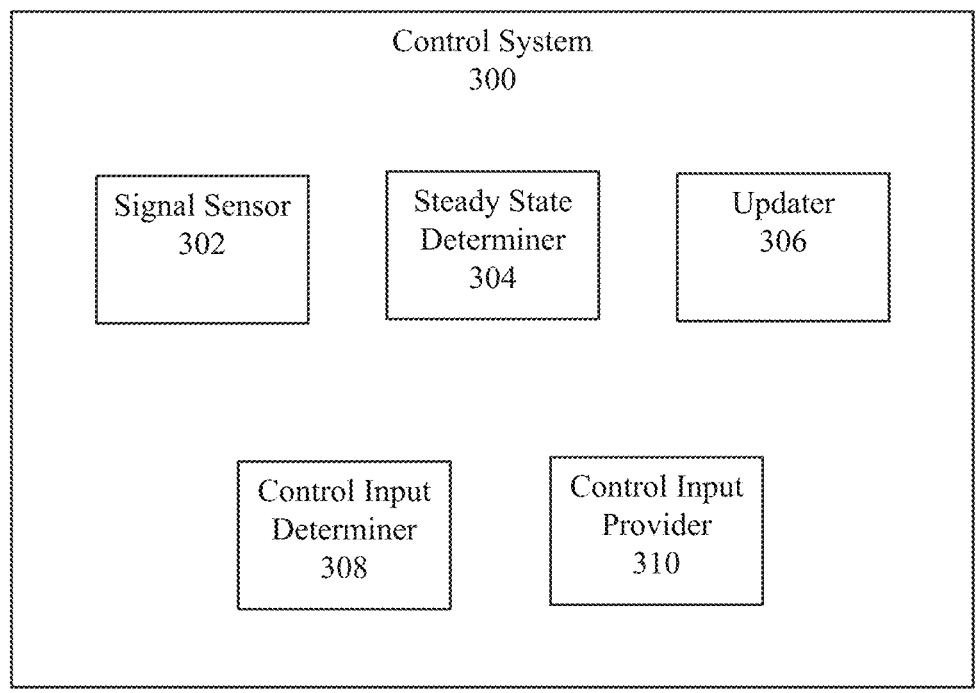
FIG. 3 is a block diagram of control system for a distribution grid.

FIG. 3 is a block diagram of a control system 300 for a distribution grid. For example, in embodiments, control system 300 may be implemented as control system 102 shown in FIG. 1. Control system 300 is configured to determine the optimal control to mitigate high power load disturbances and minimize power loss for the distribution grid. In example embodiments, control system 300 may implement at least one of a model predictive controller or the optimal steady-state feedback controller as described above. Control system 300 includes signal sensor 302, steady state determiner 304, updater 306, control input determiner 308, and control input provider 310. In embodiments, the components of system 300 may be separately implemented or they may be combined. System 300 may be implemented in a distribution grid, especially one with abnormal power loads, at a central location (e.g., a control station, a management center, an operation center, a substation, a generating station, etc.). The components of control system 300 may be implemented with commercial (e.g., CONOPT, General Algebraic Modeling System (GAMS), etc.) and/or custom software in combination with hardware. FIG. 3 will be described in reference to the flowchart of FIG. 4.

Figure 4:
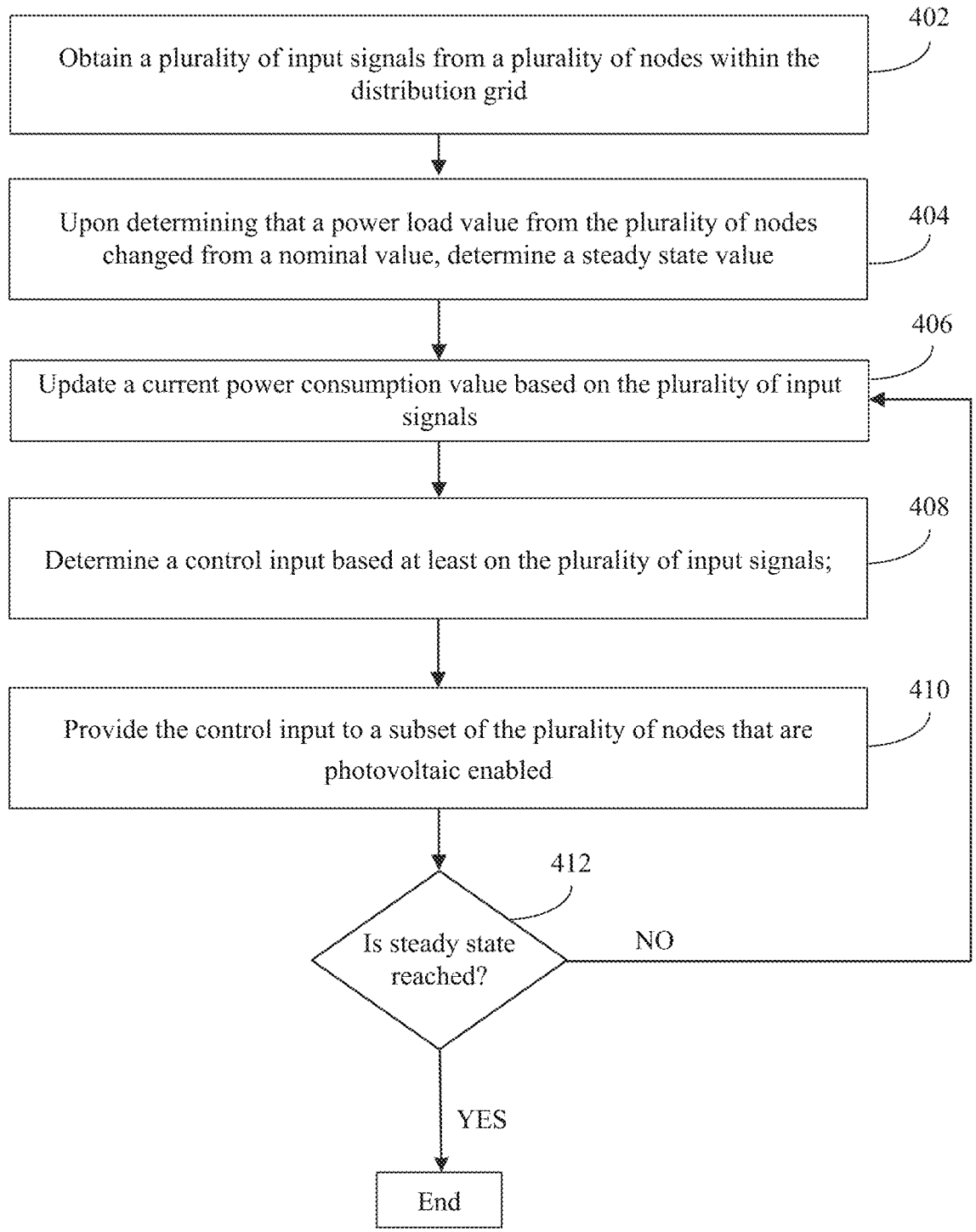
FIG. 4 is a flowchart providing a process for centralized control to mitigate high power load disturbances and minimize power loss in a distribution grid.

FIG. 4 is a flowchart 400 providing a process for centralized control to mitigate high power load disturbances and minimize power loss in a distribution grid. Flowchart 400 may be implemented by control system 300 in example embodiments.

Flowchart 400 begins with step 402, a plurality of input signals from a plurality of nodes within the distribution grid is obtained. For example, signal sensor 302 shown in FIG. 3 may obtain a plurality of input signals from a plurality of nodes, which may be residences or commercial buildings or the like, within the distribution grid. The input signal may include power load values or measured data from which power load values may be derived. For example, the input signals may include one or more of a real power consumption signal $p_j^c$ or a reactive power consumption signal $q_j^c$ from each of the plurality of nodes. The input signals may be instantaneous or processed (e.g., averaged, normalized, etc.) before or after receipt by signal sensor 302.

In step 404, a steady state value is determined upon determining that a power load value from the plurality of nodes changed from a nominal value. For example, steady state determiner 304 may determine whether power loads from the plurality of nodes changed from a nominal value at a first time instant. There may be a nominal value for each node of the plurality of the nodes. In other words, most nodes may have their own nominal values or regular patterns, but sometimes a few nodes may have unexpected high/abnormal power loads at unexpected time instants or periods that may affect the power load of the entire grid. If the $p_j^c(k)$ or $q_j^c(k)$ value changes from its nominal value for a particular node, then a steady state value may need to be determined. For example, if at time instant k=5, the real power consumed by node 19 $p_{19}^c(5)$ suddenly increases to be much higher than normal, then an optimal steady state value may need to be determined. Thus, if a power load value from any node of the plurality of nodes has changed from a nominal value, then steady state determiner 304 may determine a steady state value using equation (9) above in a model predictive control implementation or equation (10) above in an optimal steady-state feedback control implementation. Solving these equations yield the steady state values of $P_j^*$, $Q_j^*$, and $q_j^{g*}$. Steady state determiner 304 may keep track of the power load values over time, as well as the power load nominal value for each node in the distribution grid.

In step 406, a current power consumption value is updated based on the plurality of input signals. For example, updater 306 may obtain new data measurements (e.g., a real power consumption signal and/or a reactive power consumption signal, $p_j^c(k)$ and $q_j^c(k)$, respectively) and use them to update a current power consumption value(s). Updater 306 may keep track of the power consumption values over time.

In step 408, a control input is determined based at least on the plurality of input signals. For example, control input determiner 308 may determine a control input for a next time instant based on input signals from the previous time instant(s). The control input may be determined for each node of the plurality of nodes in the distribution grid. In an example embodiment, control input determiner 308 may implement a model predictive controller. That is, control input determiner 308 may implement the MPC technique described above and use equation (7) and/or equation (8) with the relaxed voltage constraint to determine the control input $q_j^c(k)$. In another example embodiment, control input determiner 308 may implement an optimal steady-state feedback controller. In this case, control input determiner 308 may implement the optimal steady-state feedback control technique described above and use equation (10) to determine the control input $q_j^g(k)$. In other embodiments, other control techniques may be utilized, for example, a fast nonlinear model predictive control strategy. In an example embodiment, commercial solvers (e.g., CONOPT) may be utilized to solve the equations and online optimization may be implemented on the software GAMS 24.9.1.

In step 410, the control input is provided to a subset of the plurality of nodes that are photovoltaic enabled. For example, control input provider 310 may be configured to provide the control input to a subset of the plurality of nodes that are photovoltaic enabled. That is, the subset may include nodes that have photovoltaic cells (e.g., solar panels, arrays or systems) connected to the grid. In example embodiments, the control input is provided to photovoltaic inverters that are connected to the plurality of nodes that are photovoltaic enabled. A photovoltaic inverter is configured to convert the variable direct current output of a photovoltaic solar panel into a utility frequency alternating current that is acceptable to a distribution grid. Thus, the photovoltaic inverter enables excess power from the associated photovoltaic cell(s) to be injected back into the distribution grid. The photovoltaic inverter may have multiple functions, such as maximum power point tracking and anti-islanding protection along with the voltage control described herein.

In step 412, a determination of whether steady state has been reached for the distribution grid is made. For example, steady state determiner 304 may be configured to determine whether steady state has been reached for the distribution grid. Upon determining that steady state has been reached, the current control input is maintained until another change in the power load value from the plurality of nodes is detected. Upon determining that steady state has not been reached, steps 406, 408 and 410 may be repeated until steady state is reached. For example, signal sensor 302 may be configured to update the power consumption value(s) based on the plurality of input with new data measurements obtained in the next time instant(s); control input determiner 308 may be configured to determine another control input for the next time instant(s); and control input provider 310 may be configured to provide the another control input to the subset of the plurality of nodes that are photovoltaic enabled. This process may continue as long as needed until steady state has been reached, at which point the process may end.

Additional Examples

Figure 5:
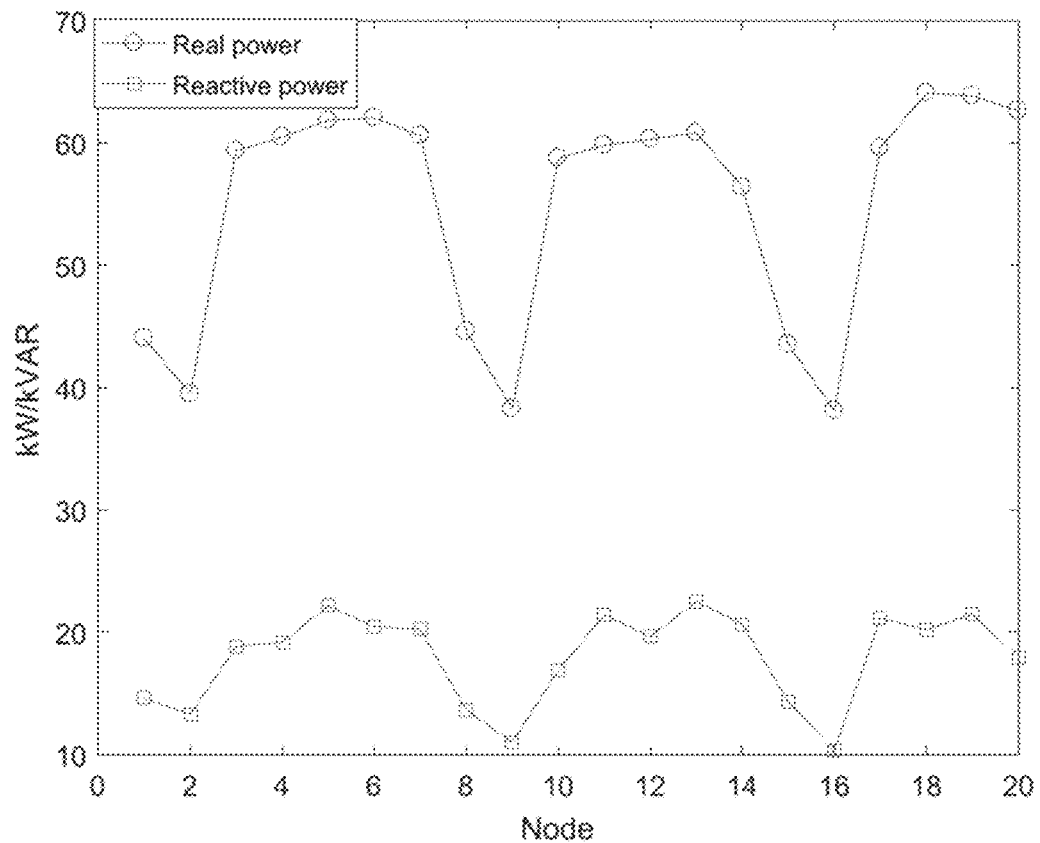
FIG. 5 is a plot of real/reactive power demands at 20 nodes under normal status.

FIG. 5 is a plot of real/reactive power demands at 20 nodes of a distribution grid under normal status. The short-period dynamics of voltage and power flows in this small-scale grid under unexpected high loads may be simulated. The voltage at the substation (node 0) is normalized as $V_0=1$. The bound of voltage fluctuation $\epsilon$ in (4) is set at 0.05, which is commonly used in practical operations of a power system, and thus suitable for demonstration purpose. Different values of E may be specified by operators. Besides the substation, there are 20 nodes (e.g., residential and commercial mixed area) in total, distributed radially with random distances from 200 to 300 meters. Their line impedances are set to 0.33+i0.38. Only half of these nodes are equipped with photovoltaic cell(s) and associated inverters to enable the $p^g$ and $q^g$ generation, whose indexes are listed as follows.

$\Omega$: {3, 6, 7, 8, 9, 11, 13, 15, 16, 20}

Here, the penetration of PV is set at a high level in order to illustrate the effectiveness of the controllers described herein. The penetration rate of 50% is considered high given the current peneration rate. The real power consumptions $p^c$ for all nodes at normal status are scaled based on data from a utility provider and shown in FIG. 5. Note that the variance of these base power loads is quite large. The power factors at each node are normally distributed with a mean of 0.95 and a standard deviation of 0.005. The reactive power profile may be generated accordingly as shown in FIG. 5.

At k=0, an unexpectedly high power load is injected into node 19 (not shown) that renders voltage fluctuations. The controller thus changes reactive power generation to compensate such voltage fluctuations and reduce power loss. The real power generated from each PV node in the morning is 15.84 kW, and the apparent power capability of the inverter is 90 kW. Under this scenario, the real power generation cannot meet demands, but reactive power may be produced to regulate the voltage. The sampling time interval of the controller is 10 seconds. The time constants $T_p$ and $T_q$ for dynamic load model are all 150 seconds, which falls into the general range identified from real measurement data. For the model predictive controller, the prediction horizon is H=100 and the control horizon is H'=60.

The controllers described herein requires online optimization. Even though the formulation of the model predictive controller contains nonconvex terms, the solver CONOPT can converge to a locally optimal solution within 0.6-0.7 seconds. The OSSFC takes 0.1 second to achieve an optimal solution. The two VAR control process used is shown in FIG. 4.

In the following examples, the model predictive controller has the best performance because it optimizes the power distribution along the entire prediction horizon. The OSSFC, relying on the on-step calculation, is faster than the model predictive controller but may yield more power loss. Other two VAR control approaches are also considered for comparison purposes. One is an Adaptive approach that switches between power loss reduction and voltage stabilization modes. The other is the IEEE Standard 1547.

Figure 6:
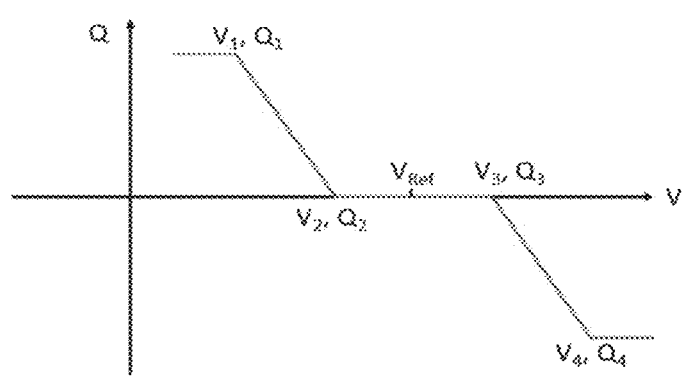
FIG. 6 is a plot of the IEEE Standard 1547, a local droop control method.

FIG. 6 shows a plot of the IEEE Standard 1547, which is a local droop control method that uses a piecewise function to determine the reactive power generation. As shown in FIG. 6, $V_1$, $V_2$, $V_{Ref}$, $V_3$, $V_4$ are tuning parameters of the controller. $Q_1$ and $Q_4$ are set as the maximum and minimum reactive power, respectively.

In each subsection below, a different model is described. Each model includes different model parameters and the dynamic responses of the controlled system under extremely high power loads are shown. For Models 1, 2, and 3, the model is perfect, and the measurement is noise free. Thus, the measured power consumptions are the same as the predicted power consumptions. For Model 4, uncertainties are introduced, and thus the predicted power loads are different from the actual values.

Model 1

The steady and transient real power load-voltage dependent coefficients and steady and transient reactive power load-voltage-dependent coefficients for this model are as follows.

$\alpha^s=-0.5$, $\alpha^t=2.16$, $\beta^s=-0.35$, $\beta^t=1.04$

At time k=0, the $p_{19}^c(0)=1277$ kW becomes twenty times and $q_{19}^c(0)=42.98$ kVAR is doubled, compared with their normal values. That is, at node 19, the power consumption is suddenly much higher than normal. For the controller design, (9) is solved to find the optimal steady state value. The resulting $q_j^{g*}$ is used as the value of $q_j^g(k+h|k), \forall h \geq H'$, $\forall j$ in the model predictive controller. The performance of the model predictive controller and OSSFC, as well as the Adaptive and IEEE 1547 standard approaches are compared in the subsequent plots.

Figure 7:
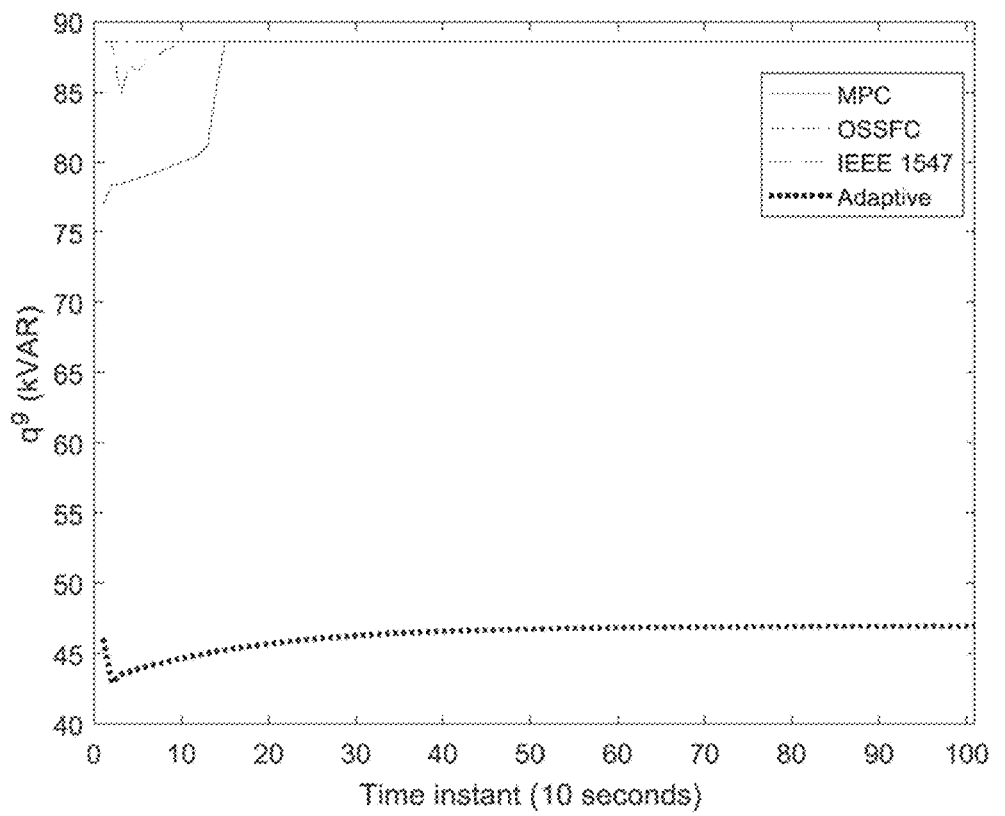
FIG. 7 is a plot of reactive power generation at node 16 for Model 1.

FIG. 7 is a plot of reactive power generation at node 16 for Model 1. That is, the control input/reactive power generation $q_j^g$ at node 16 is plotted as an example in FIG. 7. The control inputs of the model predictive controller, OSSFC, and IEEE Standard finally reach the optima steady-state value $q_j^{g*}$. While node 19 is not equipped with a PV panel, its photovoltaic-enabled neighbor, such as node 16, can generate high reactive power to compensate abnormal power loads at node 19. During power delivery, the voltage decreases along the distribution line, and it is adequate to check node 20 to verify voltage constraints.

Figure 8:
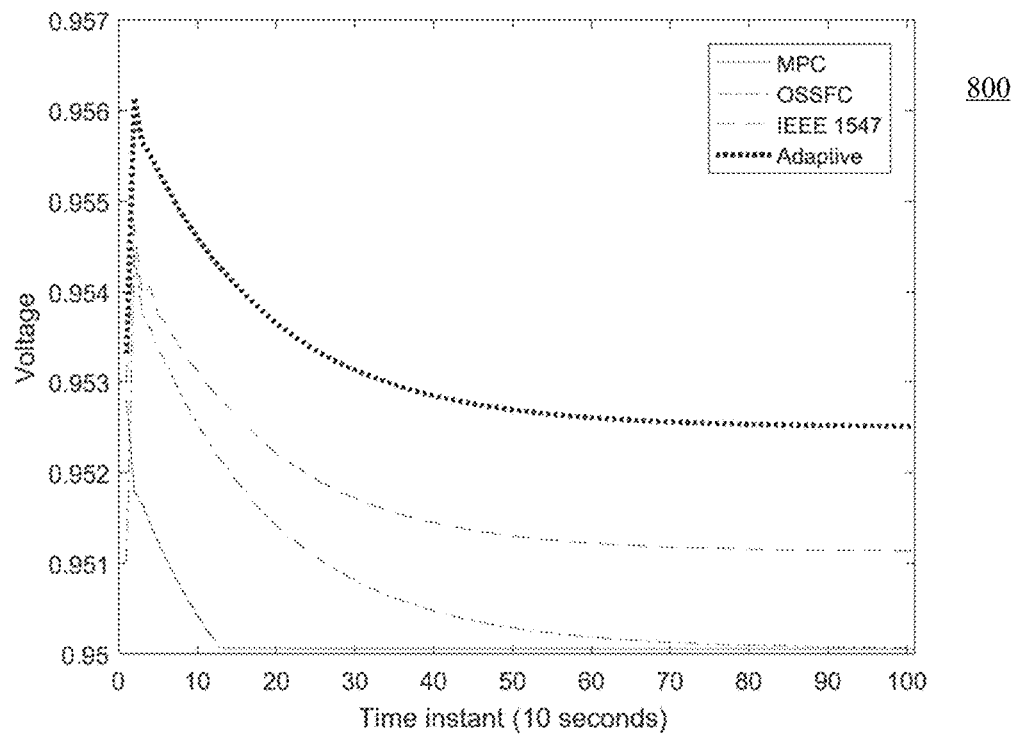
FIG. 8 is a plot of voltage profiles at node 20 for Model 1.

FIG. 8 is a plot of voltage profiles at node 20 for Model 1. In FIG. 8, at time k=0, a high power load is injected into the grid and leads to voltage below its lower bound of 0.95 V. At time k=1, all controllers is able to drive $V_{20}(k)$ back to the desired range. However, MPC is much faster than other techniques to reach the lower bound voltage of 0.95 V, thus MPC is more efficient in reducing power loss.

Figure 9:
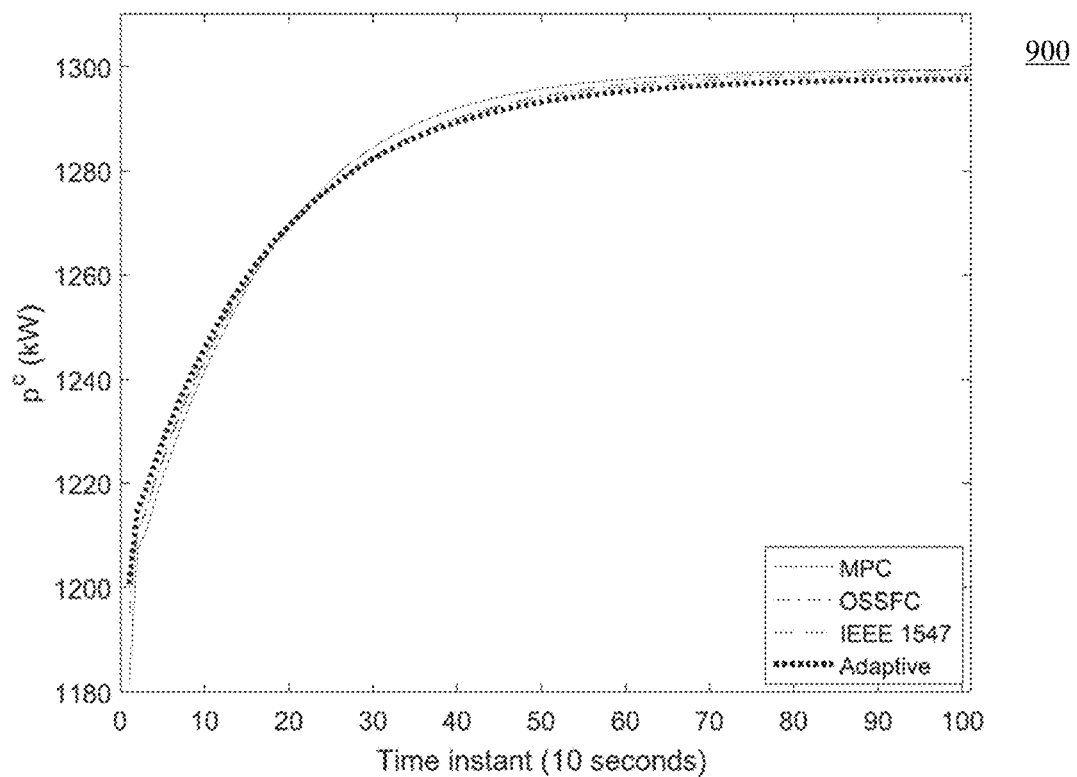
FIG. 9 is a plot of real power consumption at node 19 for Model 1.

FIG. 9 is a plot of real power consumption at node 19 for Model 1. That is, the dynamics of abnormal power load $p_j^c$ at node 19 is shown in FIG. 9. All controllers yield similar power load dynamics. Since the steady real power load-voltage dependent coefficient and reactive power load-voltage-dependent coefficient, $\alpha^s$ and $\beta^s$, respectively, are negative, the high power loads are coupled with the voltage drop. However, all controllers still manage to meet the voltage constraints. Note that the voltage is dependent on the reactive power generation at all photovoltaic-enabled nodes. The $q^g$ based on the IEEE Standard method reaches the optimal value only at node 19, and thus voltage $V_{20}$ finally converges to a nonoptimal value.

The model predictive controller and OSSFC reduce 1% power loss (normalized), compared with the Adaptive technique, as shown in Table I below. For the IEEE 1547 Standard, $V_1=-0.04$, $V_2=-0.01$, $V_{Ref}=1$, $V_3=0.02$, $V_4=0.08$. For the Adaptive, the threshold is set at 0.97 and $\alpha_1=1.85x_j/r_j$. As shown in Table I, the * indicates a voltage bound violation for the IEEE 1547 Standard in Model 4.

TABLE I

NORMALIZED OBJECTIVE VALUES IN POWER LOSS

| Schemes | MPC | OSSFC | IEEE 1547 | Adaptive |
|---|---|---|---|---|
| Model1 | 9.592 | 9.593 | 9.619 | 9.696 |
| Model2 | 7.346 | 7.354 | 7.532 | 7.701 |
| Model3 | 6.898 | 6.902 | 6.945 | 7.075 |
| Model4 | 9.299 | 9.324 | 9.360* | 9.449 |

Model 2

The steady and transient real power load-voltage dependent coefficients and steady and transient reactive power load-voltage-dependent coefficients for this model are as follows.

$\alpha^s=1.7$, $\alpha^t=1.15$, $\beta^s=1.2$, $\beta^t=0.86$

In this model, all coefficients are positive, and the steady-state power loads are lower than the initial values. At time k=0, the $p_{19}^c(0)=1149$ kW becomes eighteen times and $q_{19}^c(0)=42.98$ kVAR is doubled, compared with their normal values.

Figure 10:
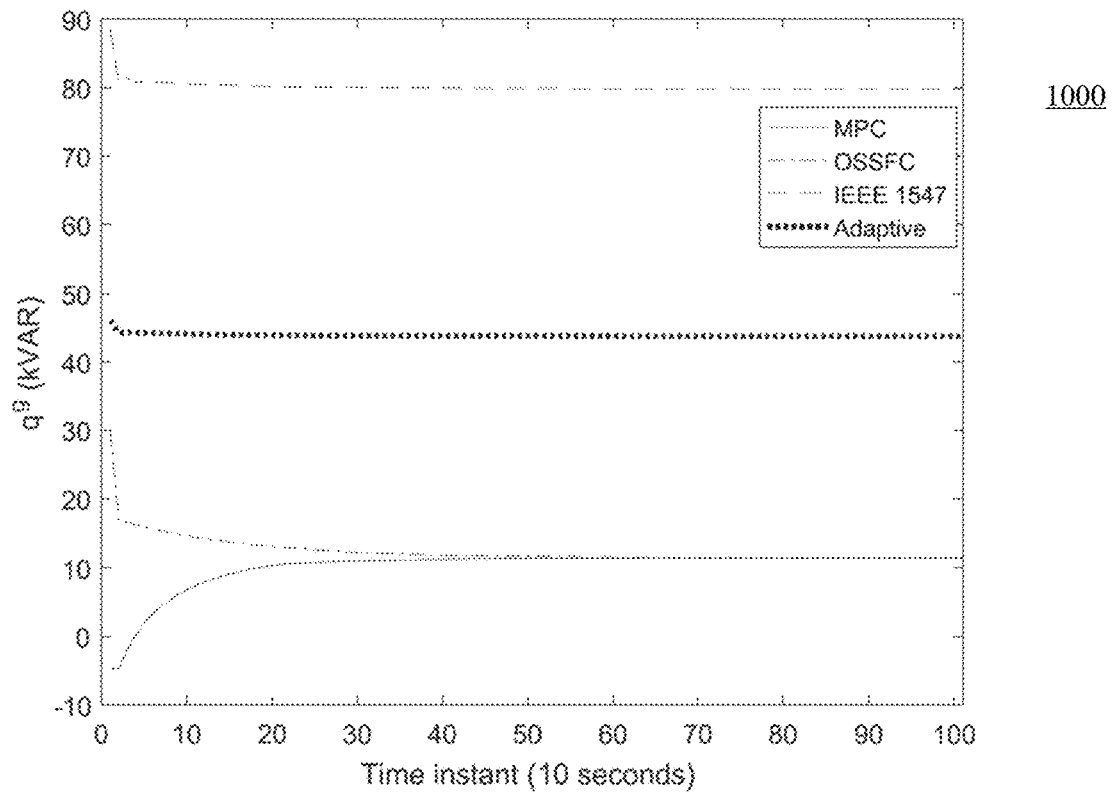
FIG. 10 is a plot of reactive power generation at node 16 for Model 2.

FIG. 10 is a plot of reactive power generation at node 16 for Model 2. As seen in FIG. 10, the control actions of the model predictive controller and OSSFC are different in the beginning and finally converge to the same input, because both of them aim to reach the optimal steady state.

Figure 11:
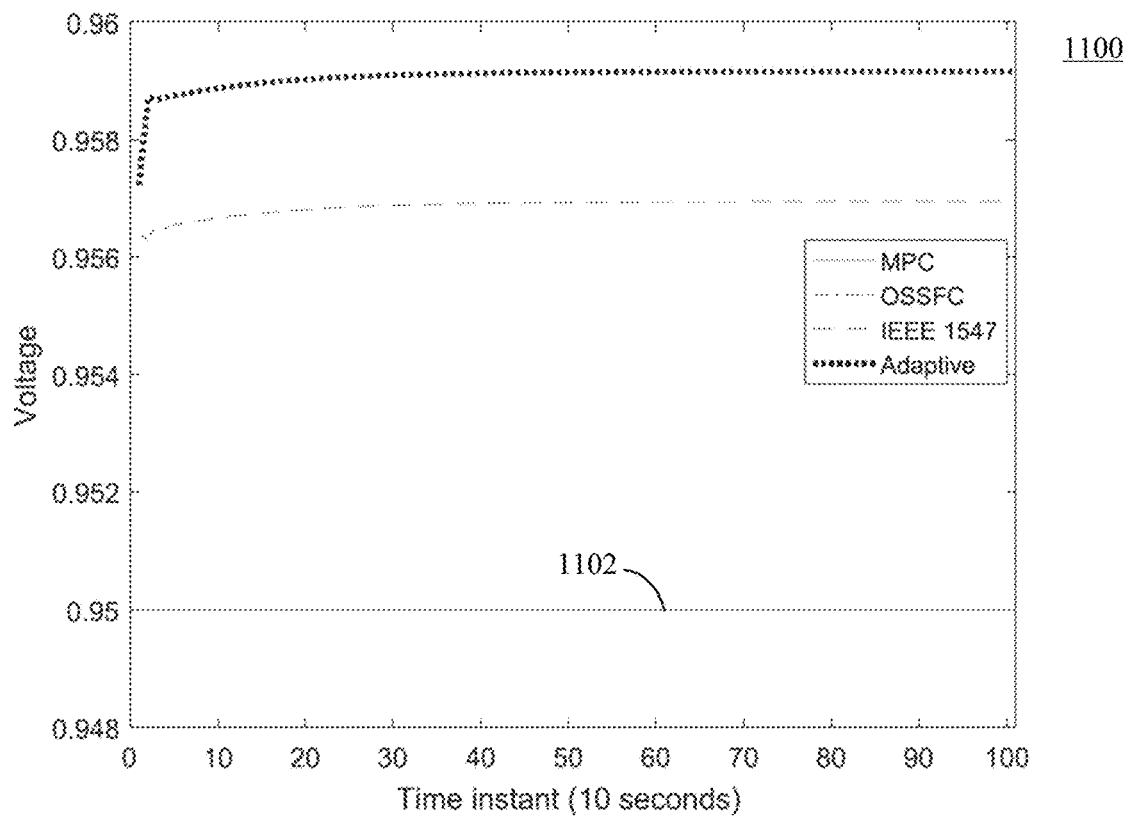
FIG. 11 is a plot of voltage profiles at node 20 for Model 2.
Figure 12:
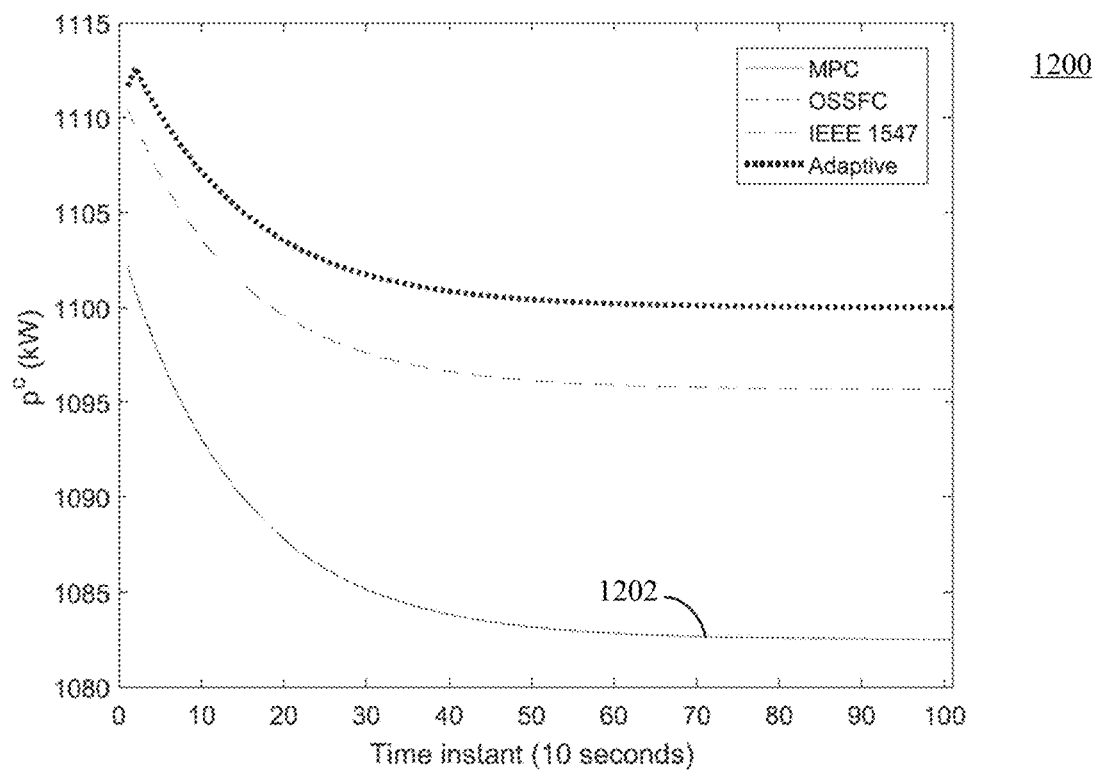
FIG. 12 is a plot of real power consumption at node 19 for Model 2.

FIG. 11 is a plot of voltage profiles at node 20 for Model 2. And, FIG. 12 is a plot of real power consumption at node 19 for Model 2. The model predictive controller and OSSFC generate almost the same curves, either in voltage or power load, respectively labeled as 1102 in FIG. 11 and as 1202 in FIG. 12. The control actions of IEEE 1547 Standard and Adaptive techniques are highly different from the others, and result in more power loss. As shown in Table I, the model predictive controller and OSSFC are able to reduce the power loss by 2.5%, compared with the other techniques.

Model 3

The steady and transient real power load-voltage dependent coefficients and steady and transient reactive power load-voltage-dependent coefficients for this model are as follows.

$\alpha^s=0.13$, $\alpha^t=1.15$, $\beta^s=-0.4$, $\beta^t=0.8$

At time k=0, the $p_{19}^c(0)=1277$ kW becomes twenty times and $q_{19}^c(0)=42.98$ kVAR is doubled, compared with their normal values. However, at k=20, the real power load at node 19 is reduced by five times of the normal value shown in FIG. 5. In this case, the new optimal steady state should be re-calculated as the initial power load has changed.

Figure 13:
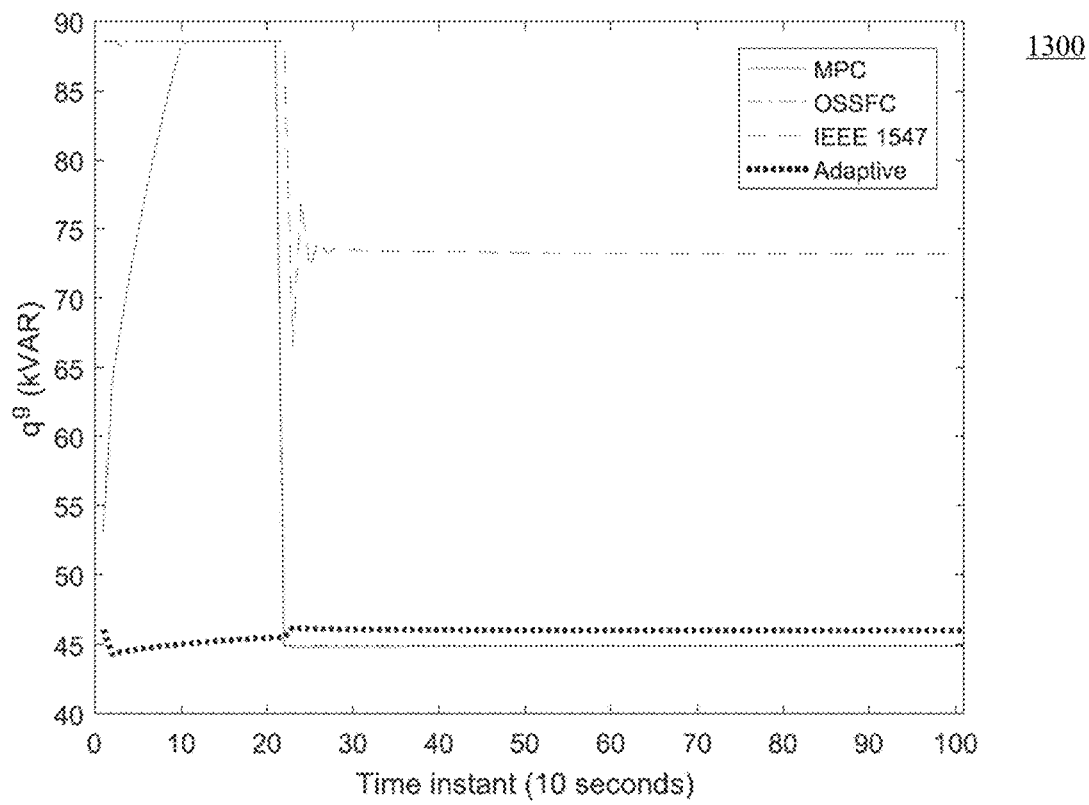
FIG. 13 is a plot of reactive power generation at node 16 for Model 3.

FIG. 13 is a plot of reactive power generation at node 16 for Model 3. As seen in FIG. 13, the $q_{16}^g$ is at a high level between k=1 and k=20. After k=20, the power consumption drops, and thus the required $q_{16}^g$ is also reduced. The inputs derived from the model predictive controller and the OSSFC are different only in the transient part, and the discrepancy near the steady state becomes negligible.

Figure 14:
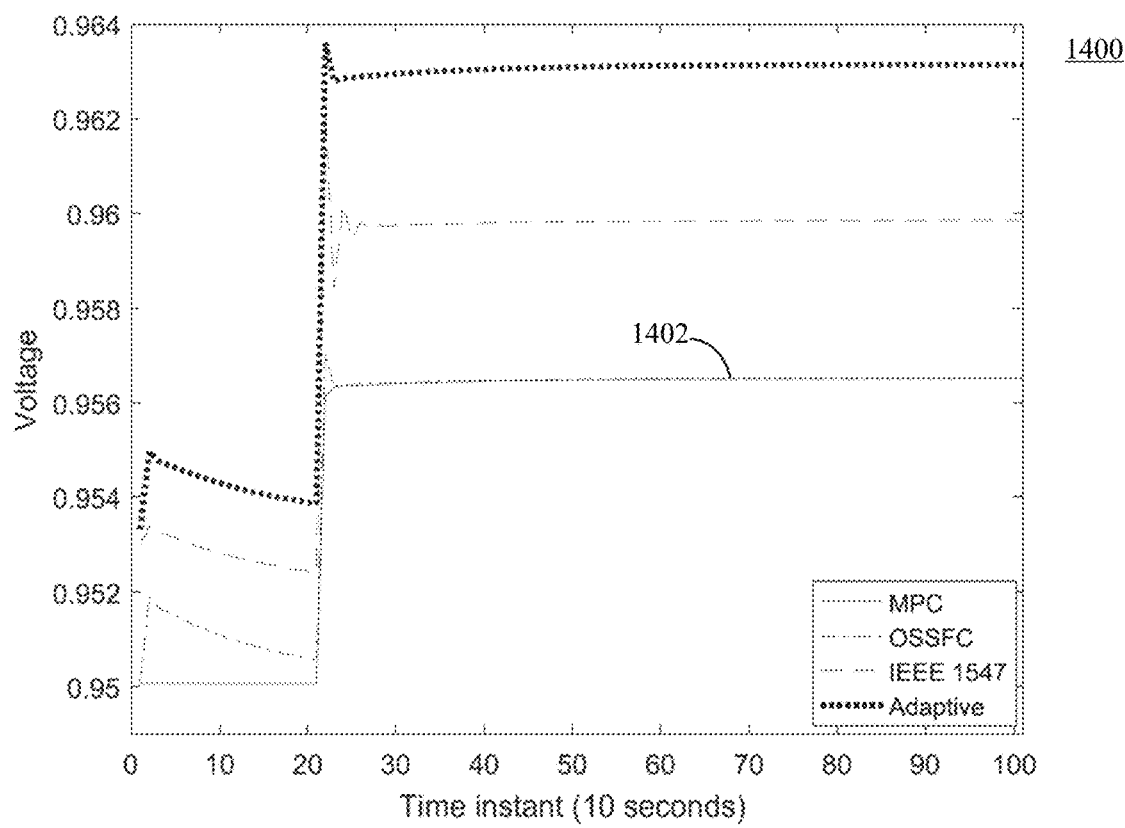
FIG. 14 is a plot of voltage profiles at node 20 for Model 3.

FIG. 14 is a plot of voltage profiles at node 20 for Model 3. As shown in FIG. 14, as power consumptions decrease, the voltage increases. The OSSFC and the model predictive controller show similar profiles, labeled as 1402, on voltage.

Figure 15:
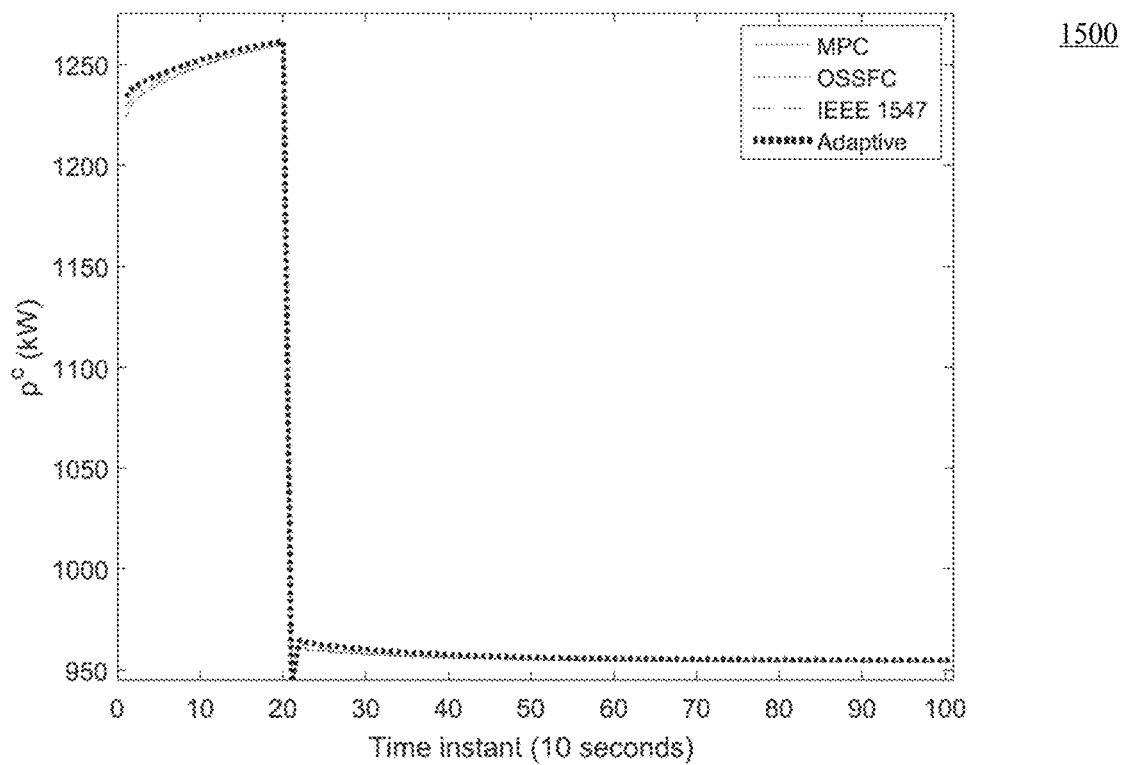
FIG. 15 is a plot of real power consumption at node 19 for Model 3.

FIG. 15 is a plot of real power consumption at node 19 for Model 3. FIG. 15 illustrates the real power load under all of the controllers, which yield similar power load profiles because $V_j$ does not significantly deviate from $V_j^0$ among all of the schemes. Table I shows that the model predictive controller and OSSFC achieve 0.7% improvement on the power loss, compared with the IEEE Standard 1547.

Model 4

If a power load model is inaccurate, then the model predictive controller may not reliably predict the long-term power loads. Both the model predictive controller and the OSSFC rely on the real-time measurement on $p_j^c(k)$ and $q_j^c(k)$ to guarantee the voltage at k+1 within the desired range. The model coefficients used in Model 4 are the same as Model 3.

$\alpha^s = 0.13$, $\alpha^t = 1.15$, $\beta^s = -0.4$, $\beta^t = 0.8$

At time k=0, the $p_{19}^c(0) = 1277$ kW becomes twenty times and $q_{19}^c(0) = 42.98$ kVAR is doubled, compared with their normal values. At k≥1, the actual $p_j^c(k)$ and $q_j^c(k)$ are as follows.

$$p_j^c(k) = p_j^r(k) + p_j^0 \left(\frac{V_j(k)}{V_j^0}\right)^{\alpha_j^t} + \delta_{p_j^c(k)} \qquad (11)$$

$$q_j^c(k) = q_j^r(k) + q_j^0 \left(\frac{V_j(k)}{V_j^0}\right)^{\beta_j^t} + \delta_{q_j^c(k)} \qquad (12)$$

where model uncertainties are normally distributed $\delta_{p_j^c(k)} \sim N(0, (0.05 p_j^c(0))^2)$ and $\delta_{p_j^c(k)} \sim N(0, (0.05 q_j^c(0))^2)$.

Figure 16:
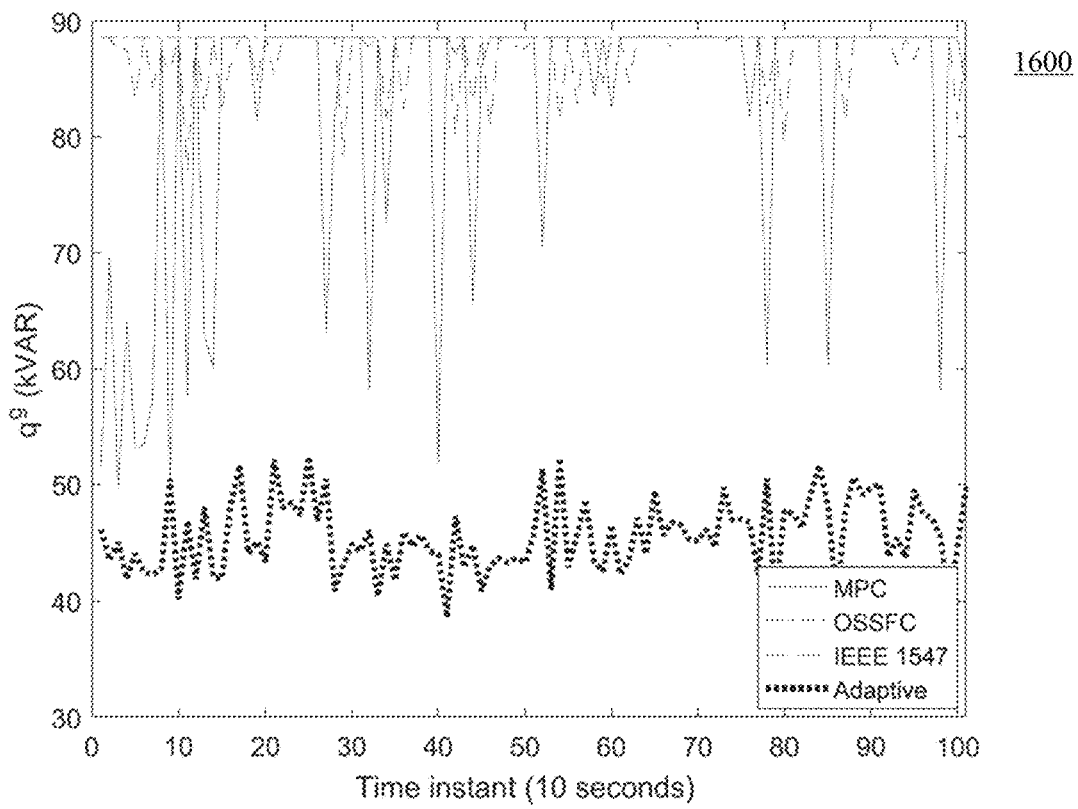
FIG. 16 is a plot of reactive power generation at node 16 for Model 4.

FIG. 16 is a plot of reactive power generation at node 16 for Model 4. To compensate the model uncertainties, the PV inverter has to frequently change the reactive power $q^g$, as shown in FIG. 16. The model predictive controller and the OSSFC determine control actions based on the real-time measurement of $p^c$ and $q^c$ at all nodes, and thus respond to the power fluctuation promptly.

Figure 17:
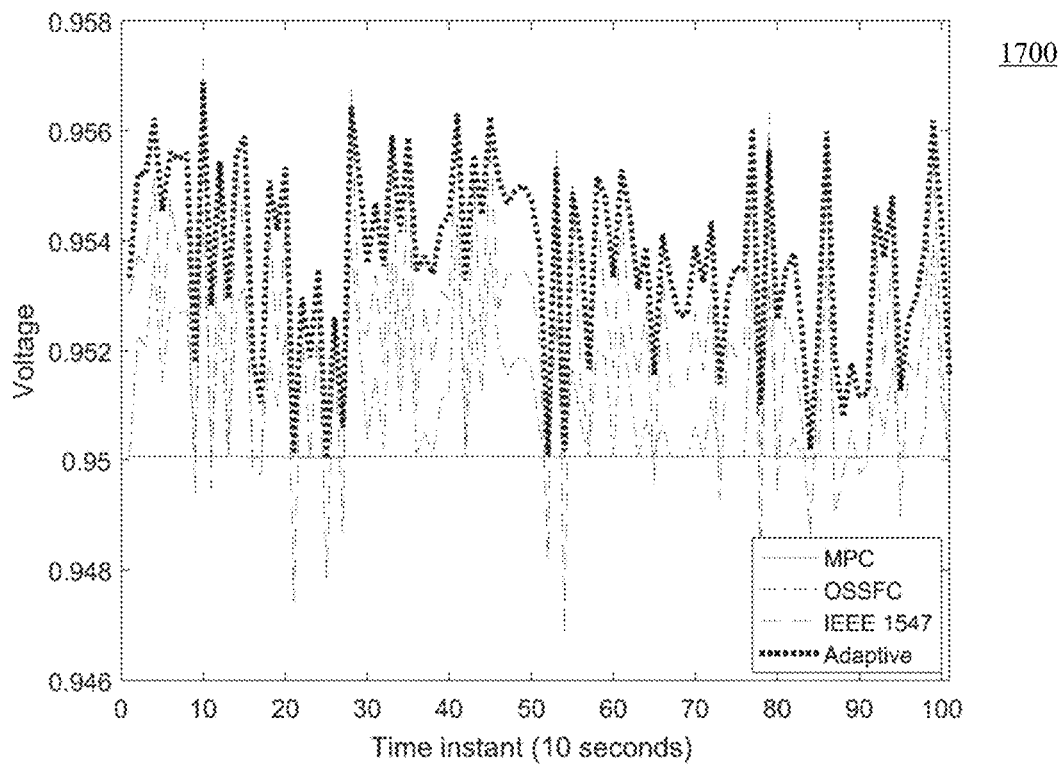
FIG. 17 is a plot of voltage profiles at node 20 for Model 4.

FIG. 17 is a plot of voltage profiles at node 20 for Model 4. The Adaptive technique switches all inverters to the voltage stabilization mode once it detects an abnormal voltage. The IEEE 1547 Standard cannot guarantee the lower bound on the voltage, as shown in FIG. 17.

Figure 18:
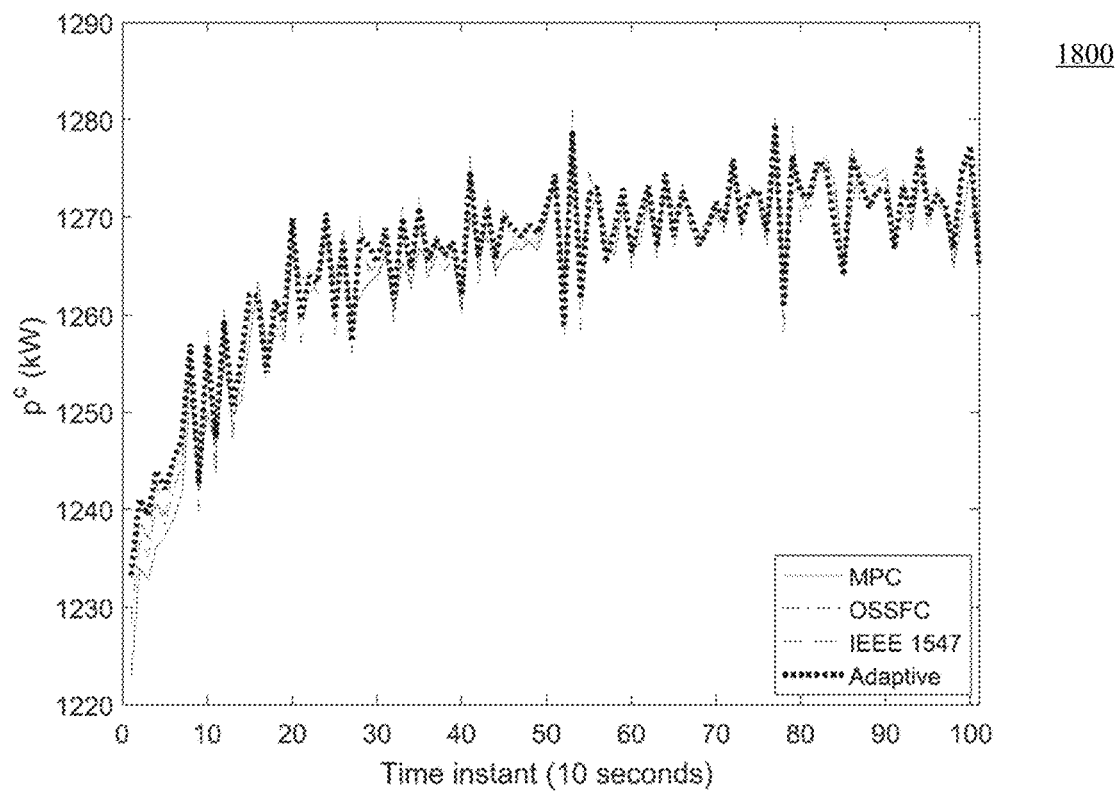
FIG. 18 is a plot of real power consumption at node 19 for Model 4.

FIG. 18 is a plot of real power consumption at node 19 for Model 4. The real power loads under all of the controllers are only slightly different, as shown in FIG. 18, for node 19. The model predictive controller and OSSFC have similar performance on the power loss. In a scenario with very limited computational ability and/or resources, the OSSFC may be a better choice than the model predictive controller.

As seen from the non-limiting examples/models above, different control strategies described herein do reduce power loss and voltage variation on a photovoltaic-connected grid with unexpected abnormal power loads. The model predictive controller utilizes online optimization to calculate the reactive power generation $q^g$ along the control/prediction horizon, whereas the OSSF determines control actions by minimizing the difference between $q^g$ and $q^{g*}$, subject to the voltage constraints. Even though the generated reactive power $q^g$ are different with these two controllers, the resulting power losses are similar. The model predictive controller may have a better performance, but requires more computational efforts. The OSSFC relies on the real-time measurement of power loads and one-step calculation for determining $q^g$ to meet voltage constraints and reach the optimal operating point. Thus, the OSSFC is not as computationally demanding or suitable for online implementation. However, since the OSSFC does not predict the long-term dynamics, its convergence to the optimal steady state may not be guaranteed. Thus, the choice of the model predictive controller or OSSFC may depend on the requirements in the different areas of the grid. In an embodiment, both the model predictive controller and the OSSFC may be implemented, and whichever provides the best/optimal solution may be selected as the control input.

Example Computer System Implementation

Each of control system 102 and control system 300, and flowchart 400 may be implemented in hardware, or hardware combined with software and/or firmware. For example, control system 102 and control system 300, and flowchart 400 may be implemented as computer program code/instructions configured to be executed in one or more processors and stored in a computer readable storage medium. Alternatively, control system 102 and control system 300, and flowchart 400 may be implemented as hardware logic/electrical circuitry.

For instance, in an embodiment, one or more, in any combination, of control system 102 and control system 300 may be implemented together in a system-on-a-chip (SoC). The SoC may include an integrated circuit that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 19:
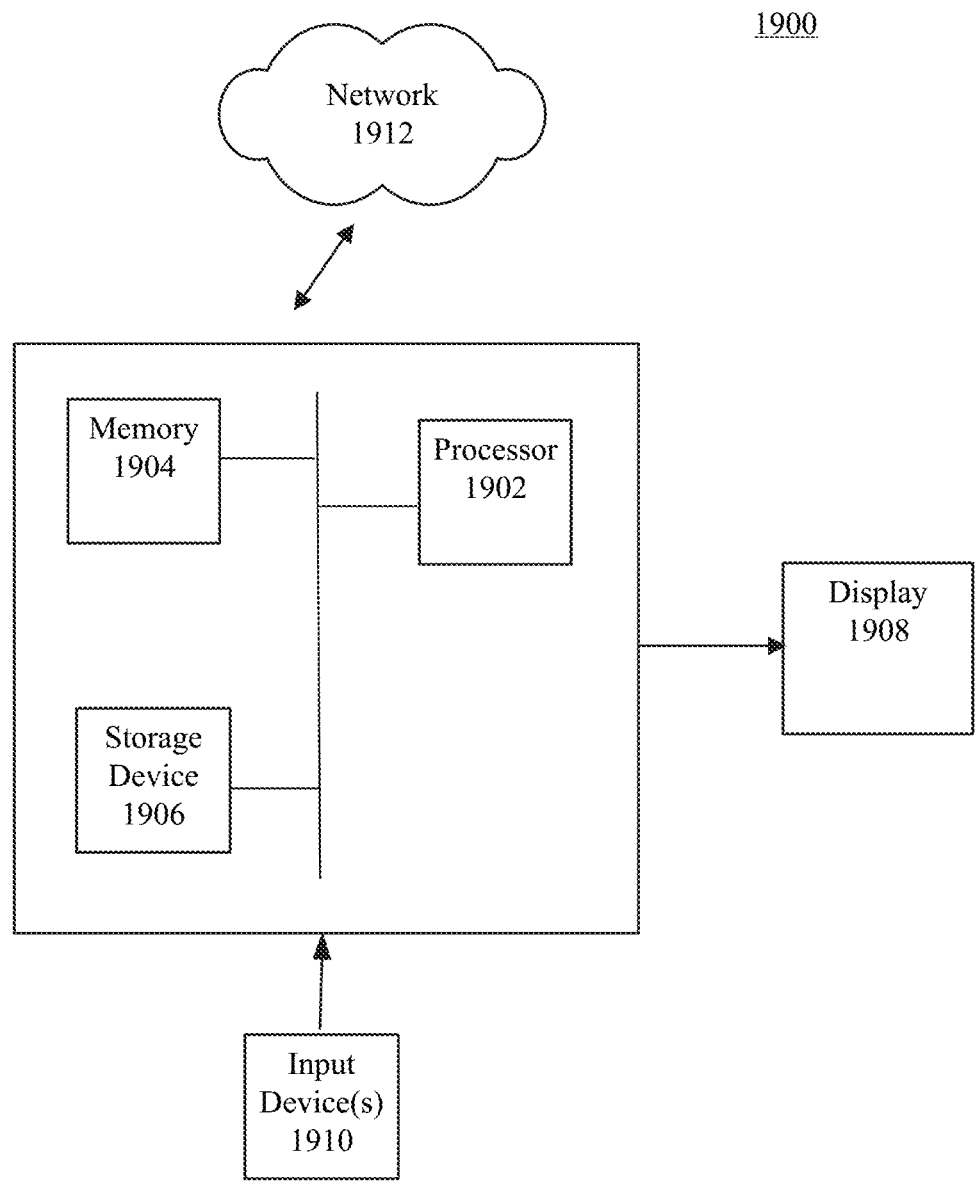
FIG. 19 is a block diagram of an example computer system in which embodiments may be implemented.

FIG. 19 is a block diagram of an example computer system in which embodiments may be implemented. The description of computing device 1900 is provided for purposes of illustration, and is not intended to be limiting. Embodiments may be implemented in further types of computer systems, as would be known to persons skilled in the relevant art(s).

As shown in FIG. 19, computing device 1900 includes processor 1902, memory 1904, and storage device 1906, and these components may be coupled together via a bus.

Processor 1902 may be referred to as a processor circuit or a processing unit. Processor 1902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor 1902 may execute program code stored in a computer readable medium, such as program code of an operating system, an application program, and other programs.

Memory 1904 includes any system memory, for example, read only memory (ROM) and random access memory (RAM) and may store a basic input/output system (e.g., BIOS).

Storage device 1906 may include any of a hard disk drive, a magnetic disk drive, an optical disk drive, a removable optical disk (e.g., CD ROM, DVID ROM), a flash memory card, a digital video disk, RAMs, ROMs, or other hardware storage media. Storage device 1906 and its associated computer readable media provide nonvolatile storage of computer-readable instructions, data structures, program modules and other data for computing device 1900.

A number of program modules may be stored on memory 1904 and/or storage device 1906. These programs include an operating system, an application program, other programs, and program data. Such an application program or other programs may include, for example, computer program logic (e.g., computer program code or instructions) for implementing system components and/or embodiments described herein.

A user may enter commands and information into the computing device 1900 through input devices 1910 such as a keyboard and a pointing device. Other input devices (not shown) may include a microphone, joystick, game pad, satellite dish, scanner, touch screen and/or touch pad, voice recognition system to receive voice input, gesture recognition system to receive gesture input, or the like. These and other input devices are often connected to processor 1902 through a serial port interface that is coupled to the bus, but may be connected by other interfaces, such as a parallel port, game port, or a universal serial bus (USB).

A display 1908 is also connected to the bus via an interface, such as a video adapter. Display 1908 may be external to, or incorporated in computing device 1900. Display 1908 may display information, as well as being a user interface for receiving user commands and/or other information (e.g., by touch, finger gestures, virtual keyboard, etc.). In addition to display 1908, computing device 1900 may include other peripheral output devices (not shown) such as speakers and printers.

Computing device 1900 is connected to a network 1912 (e.g., the Internet) through an adaptor or network interface, a modem, or other means for establishing communications over the network.

As used herein, the terms "computer program medium," "computer-readable medium," and "computer-readable storage medium" are used to refer to physical hardware media such as the hard disk associated with storage device 1906. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

CONCLUSION

While various embodiments of the disclosed subject matter have been described above, it should be understood that they have been presented by way of example only, and not limitation. Various modifications and variations are possible without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system for controlling a photovoltaic-enabled distribution grid, comprising:
   a plurality of photovoltaic inverters connected to a plurality of nodes that are photovoltaic enabled in the distribution grid; and
   a centralized controller configured to
      obtain a plurality of input signals from the plurality of nodes;
      determine an optimal steady state reactive power value for the plurality of nodes upon determining that one or more power loads changed from nominal values;
      update a current power consumption value based on the plurality of input signals;
      determine a control input based at least on the plurality of input signals by implementing an optimal steady state feedback controller that is configured to minimize a difference between implementable reactive power and an optimal steady state reactive power at each time instant to compensate for abnormal power loads; and
   provide the control input to the plurality of nodes that are photovoltaic enabled to control operations of the plurality of nodes.

2. The system of claim 1, wherein the centralized controller is further configured to determine whether steady state has been reached for the distribution grid; and
   upon determining that steady state has been reached, maintain the control input until another change in the one or more power loads is detected.

3. The system of claim 1, wherein the centralized controller is further configured to determine whether steady state has been reached for the distribution grid; and
   upon determining that steady state has not been reached, update the current power consumption value;
      determine another control input; and
      provide the another control input to the plurality of nodes that are photovoltaic enabled.

4. The system of claim 1, wherein the centralized controller is further configured to provide the control input to the photovoltaic inverters.

5. The system of claim 1, wherein the plurality of input signals comprises at least one of a real power consumption signal or a reactive power consumption signal from each of the plurality of nodes.

6. A method for controlling a photovoltaic-enabled distribution grid, comprising:
   obtaining a plurality of input signals from a plurality of nodes that are photovoltaic enabled within the distribution grid;
   determining an optimal steady state reactive power value for the plurality of nodes based on determining that one or more power loads changed from nominal values at a first time instant;
   updating a current power consumption value based on the plurality of input signals;
   determining a control input based at least on the plurality of input signals using an optimal steady state feedback controller that is configured to minimize a difference between implementable reactive power and an optimal steady state reactive power at each time instant to compensate for abnormal power loads; and
   providing the control input to the plurality of nodes that are photovoltaic enabled to control operations of the plurality of nodes.

7. The method of claim 6, further comprising:
   determining whether steady state has been reached for the distribution grid; and
   upon determining that steady state has been reached, maintaining the control input until another change in the one or more power loads is detected.

8. The method of claim 6, further comprising:
determining whether steady state has been reached for the distribution grid; and
upon determining that steady state has not been reached,
updating the power consumption value,
determining another control input, and
providing the another control input to the plurality of nodes that are photovoltaic enabled.

9. The method of claim 6, wherein the providing the control input comprises:
providing the control input to photovoltaic inverters connected to the plurality of nodes that are photovoltaic enabled.

10. The method of claim 6, wherein the plurality of input signals comprises at least one of a real power consumption signal or a reactive power consumption signal from each of the plurality of nodes.

* * * * *